(12) United States Patent
Zhou et al.

(10) Patent No.: US 12,282,655 B2
(45) Date of Patent: Apr. 22, 2025

(54) ADAPTIVE MAPPING FOR TRANSPARENT BLOCK DEVICE LEVEL COMPRESSION

(71) Applicant: Lemon Inc., Grand Cayman (KY)

(72) Inventors: Ping Zhou, Los Angeles, CA (US);
Longxiao Li, Los Angeles, CA (US);
Peng Xu, Los Angeles, CA (US); Kan Frankie Fan, Los Angeles, CA (US);
Chaohong Hu, Los Angeles, CA (US);
Fei Liu, Los Angeles, CA (US); Hui Zhang, Los Angeles, CA (US); Di Xu, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 49 days.

(21) Appl. No.: 18/163,612

(22) Filed: Feb. 2, 2023

(65) Prior Publication Data
US 2023/0176734 A1    Jun. 8, 2023

(51) Int. Cl.
*G06F 3/06* (2006.01)

(52) U.S. Cl.
CPC ............ *G06F 3/0608* (2013.01); *G06F 3/064* (2013.01); *G06F 3/0673* (2013.01)

(58) Field of Classification Search
CPC ...... G06F 3/0608; G06F 3/064; G06F 3/0673; G06F 3/0631; G06F 3/0659; G06F 3/067; G06F 3/061; G06F 2206/1004
See application file for complete search history.

(56) References Cited

U.S. PATENT DOCUMENTS

| | | | |
|---|---|---|---|
| 11,709,720 B1 * | 7/2023 | Fournier | G06F 9/545 |
| | | | 719/318 |
| 2018/0018100 A1 * | 1/2018 | Aho | G06F 3/064 |
| 2019/0065392 A1 * | 2/2019 | Erez | G06F 12/0246 |
| 2019/0361804 A1 | 11/2019 | Park | |
| 2022/0092033 A1 * | 3/2022 | Wang | G06F 16/1752 |

OTHER PUBLICATIONS

Extended European Search Report in European Appln No. 24154012.9, dated Jun. 12, 2024, 10 pages.

* cited by examiner

*Primary Examiner* — Tracy C Chan
(74) *Attorney, Agent, or Firm* — Fish & Richardson P.C.

(57) ABSTRACT

A method for adaptive mapping for data compression includes determining an input/output (I/O) request pattern, dynamically switching between a segment mapping mode and a flat hash table mapping mode based on the determined I/O request pattern, updating a shared mapping table for the segment mapping mode and the flat hash table mapping mode, and adjusting an entry of the mapping table based on the determined I/O request pattern and a status of the entry.

20 Claims, 14 Drawing Sheets

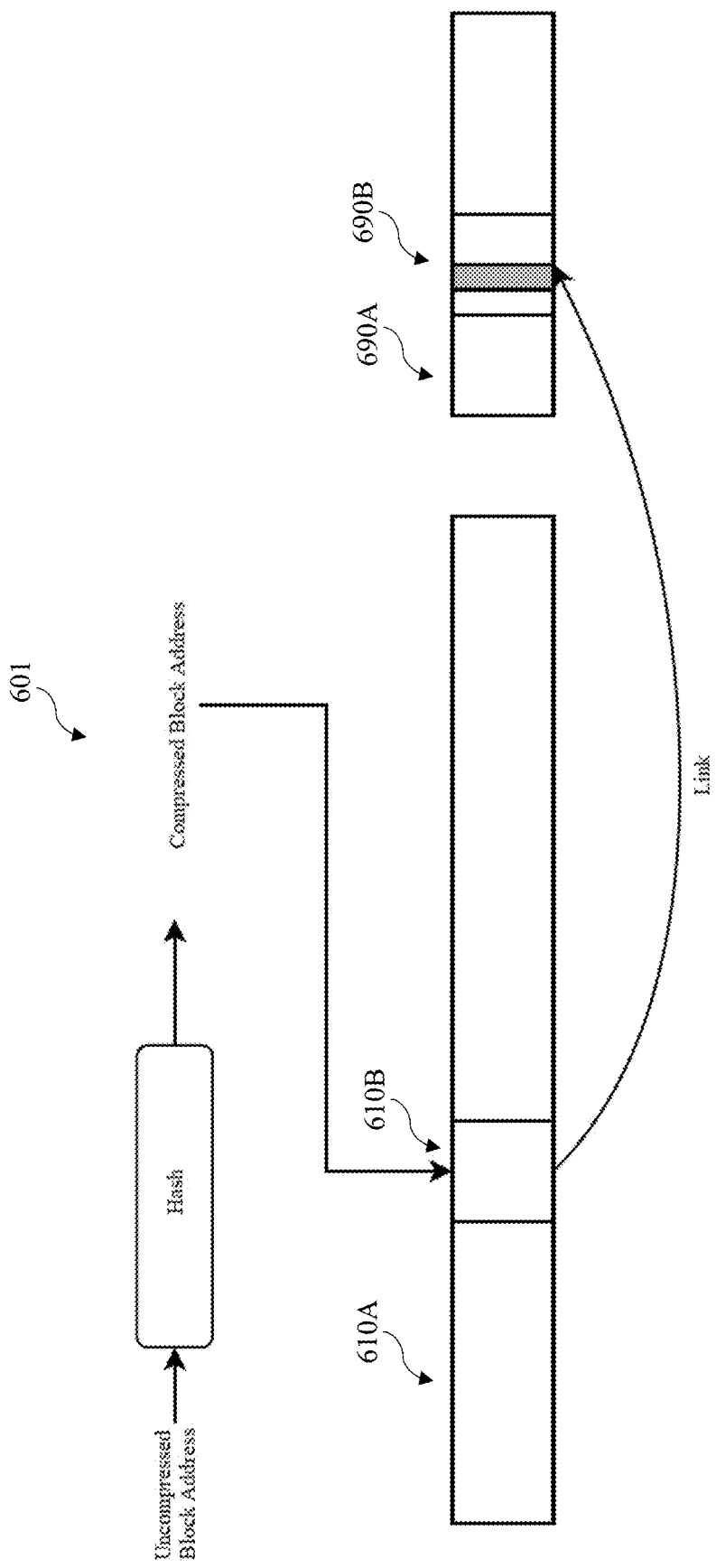

ADAPTIVE MAPPING FOR TRANSPARENT BLOCK DEVICE LEVEL COMPRESSION

FIELD

The embodiments described herein pertain generally to block device level compression mapping. More specifically, the embodiments described herein pertain to adaptive mapping for transparent block device level compression.

BACKGROUND

Block storage, or referred to as block-level storage, is a common form of storage that is used to store data in blocks e.g., on storage area networks, in cloud-based storage environments, etc. Each block may be stored as a separate piece with a unique identifier. Cloud-based block storage or storage device is a common product offered by cloud service providers (CSPs). In block storage or storage devices, transparent compression may be a desirable feature by which compression may be done at the block device level and the compression may be transparent to the host (e.g., a server running the user's applications), and no additional software change may be needed on the host. The mapping between the uncompressed block addresses and compressed block addresses needs to be maintained and tracked carefully due to e.g., the non-linear mapping between the compressed address (i.e., the address for the block storage device) and the uncompressed address (i.e., the address presented to the host). Existing mappings either have a mapping table that may not be able to fit in the local memory, which requires additional read/write to external storage, e.g., disk, and/or may lead to extra latency and/or a low throughput.

SUMMARY

Features in the embodiments disclosed herein may help optimizing performance by leveraging a sequential input/output (I/O) pattern from the workloads, rendering a higher throughput or bandwidth and/or a lower overhead on the block device when handling sequential I/O requests. Embodiments disclosed herein may include an adaptive mapping scheme that dynamically switches between segment mapping and flat hash table mapping.

Features in the embodiments disclosed herein may reduce memory overhead. All mapping information may be tracked in the memory instead of on the external storage device such as a disk, and no extra disk read may be needed. The segment based mapping may be used for sequential I/O for better throughput. The flat hash table based mapping may be used for random I/O for low latency. The mapping scheme disclosed herein may adapt to the sequential I/O and/or the random I/O dynamically, and may enjoy the advantages of both the segment based mapping and the flat hash table based mapping schemes.

In one example embodiment, a method for adaptive mapping for data compression includes determining an input/output (I/O) request pattern, dynamically switching between a segment mapping mode and a flat hash table mapping mode based on the determined I/O request pattern, updating a shared mapping table for the segment mapping mode and the flat hash table mapping mode, and adjusting an entry of the mapping table based on the determined I/O request pattern and a status of the entry.

In another example embodiment, a block storage device control system includes a memory region tracking a shared mapping table and a processor to determine an input/output (I/O) request pattern, dynamically switch between a segment mapping mode and a flat hash table mapping mode based on the determined I/O request pattern, access the mapping table for the segment mapping mode and the flat hash table mapping mode, adjust an entry of the mapping table based on the determined I/O request pattern and a status of the entry, compress uncompressed data to compressed data, and store the compressed data to a space in a block storage device that corresponds to a compressed block address indicated by the adjusted entry.

In yet another example embodiment, a non-transitory computer-readable medium having computer-executable instructions stored thereon is provided. The instructions, upon execution, cause one or more processors to perform operations including determining an input/output (I/O) request pattern, dynamically switching between a segment mapping mode and a flat hash table mapping mode based on the determined I/O request pattern, accessing a shared mapping table for the segment mapping mode and the flat hash table mapping mode, adjusting an entry of the mapping table based on the determined I/O request pattern and a status of the entry, compressing uncompressed data to compressed data, and storing the compressed data to a space in a block storage device that corresponds to a compressed block address indicated by the adjusted entry.

It is to be understood that a "flat mapping table" scheme may be used for mapping and/or tracking the mappings from the uncompressed block addresses to the compressed block addresses. That is, the flat mapping table is addressed using the uncompressed block addresses. For example, the uncompressed block addresses are used as the index of the flat mapping table, and each entry of the flat mapping table contains the corresponding compressed block address for the block storage device. Using a flat mapping table scheme, assuming each four-kilobyte (KB) uncompressed address uses a 64-bit mapping entry, managing 64-terabyte (TB) storage space may require a flat mapping table having a size of 128-gigabyte (GB). Such a large flat mapping table may lead to performance issues since the flat mapping table may not be able to fit in the memory such as a dynamic random-access memory (DRAM) and may have to be stored on an external disk (e.g., a storage device such as a block storage device, etc.), and almost each input/output (I/O) may require an extra read from the disk. Typically a 4 GB cache (for the mapping table) may cover 2 TB of storage space. If the storage space being managed (e.g., compressed, etc.) is 64 TB, then the hit rate of the cache may be about 3.1% (2/64) under the random I/O, and almost each I/O may require an extra read from disk. With the storage space growing larger (e.g. more disks are attached to the storage device), the hit rate of the cache may drop proportionally, leading to even worse performance.

It is also to be understood that a "hash table" mechanism or scheme may be used to map the uncompressed addresses to the compressed addresses. In such scheme, a hash table is used, and the hash table uses a single hash function (without configuration and/or having a single configuration) to map the uncompressed addresses to the compressed addresses. However, one hash function may not lead to a correct mapping. Multiple attempts may be needed to get the correct mapping, which may lead to extra latency and/or lower throughput.

It is further to be understood that a "flat hash table" mechanism or scheme may be used to map the uncompressed addresses to the compressed addresses. For a sequential read or write (e.g. 32 KB read or write, etc.), every 4 KB block address can be mapped using one of the hash functions individually. The 32 KB request may then become eight random read or write requests on the block device (or the block storage device, e.g., a disk or the like) after mapping. In such case, optimizing the performance (that renders a higher throughput or bandwidth and/or a lower overhead on the block device) by leveraging the sequential input/output (I/O) pattern from the workloads might be lost.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIG. 6B is a schematic view of another example overflow handling mechanism, arranged in accordance with at least some embodiments described herein.

DETAILED DESCRIPTION

Figure 1:
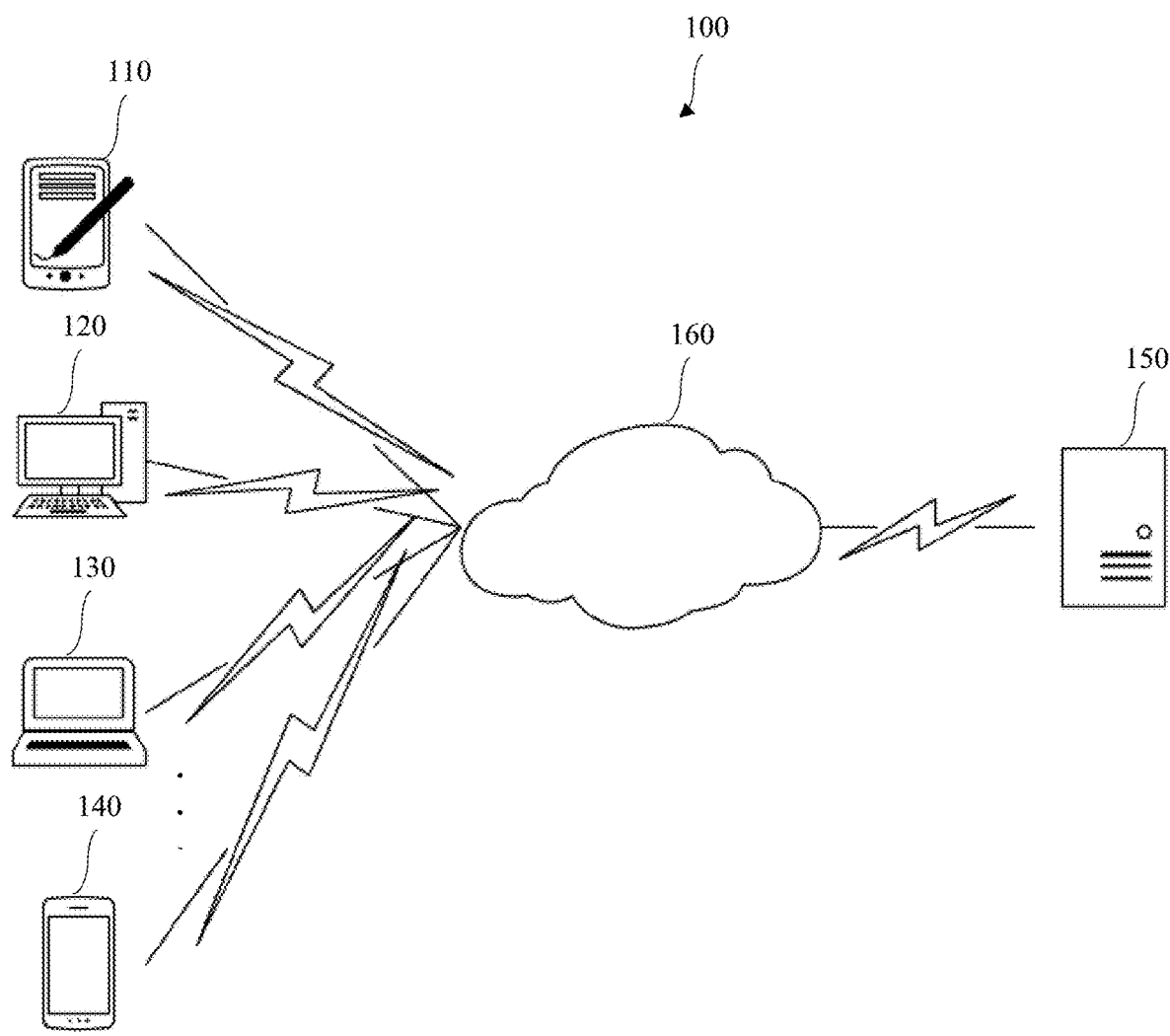
FIG. 1 is a schematic view of an example cloud-based block storage system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "block" in data storage may refer to a fixed-size amount of storage within a storage medium that is capable of storing a piece of data. It is to be understood that data may be stored in blocks, and each block may be assigned a unique address or identifier. In an example embodiment, the size of each block may be 4 KB. For example, in the embodiments described herein, the uncompressed block address (presented to and used by the host or application(s) running on the host) and/or the compressed block address (for a block storage device) may correspond to a space in a unit of a 4 KB block.

As referenced herein, "hash function" may refer to a function that converts an input (e.g., a numerical value) into an output (e.g., another numerical value). It is to be understood that a hash function is a term of art and may be used in data storage and/or retrieval application(s) to access data in a small and nearly constant time per retrieval.

As referenced herein, "metadata" may refer to data that provides information about other data, but not the content of the data. It is to be understood that metadata may be referred to as "data about data", i.e., data providing information about one or more aspects of other data. In some example embodiments, metadata may include time and date of creation, size of the data, source of the data, usage of data, linkage between two pieces of data, etc.

As referenced herein, "block address", "logical block address" or "LBA" may refer to an address or location of blocks of data stored on computer storage device(s) such as a block device (e.g., a disk, or the like). It is to be understood that a block device may be addressed by a host using logical block addressing mechanism, which assigns each block (e.g., having a size of 4 KB or the like) on the block device a storage number/address (a logical block address) starting at zero. The controller or processor (e.g., in 220 of FIG. 2) of the block device is then responsible for mapping the logical block addresses to physical locations on the block device.

As referenced herein, "segment" may refer to a memory page (or a portion of a memory page) that includes the data of some adjacent disk sectors. It is to be understood that a segment has a boundary (e.g., in the logical block addressing, etc.). In an example embodiment, a segment may have a size of 32 KB. It is also to be understood that a segment may have any suitable size. It is also to be understood that the entire logical block address space may be represented by segment numbers starting at zero.

As referenced herein, a "sequential" read or write (or a "sequential" input or output or a "sequential" I/O) of the host may refer to a host read or write (or I/O) of data having a size of a segment or more. A "random" read or write (or a "random" input or output or a "random" I/O) of the host may refer to a host read or write (or I/O) of data having a size less than a size of a segment.

FIG. 1 is a schematic view of an example cloud-based block storage system 100, arranged in accordance with at least some embodiments described herein.

The system 100 may include terminal devices 110, 120, 130, and 140, a network 160, and a server (i.e., a host) 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services, such as a server for providing cloud services (including e.g., cloud storage and/or retrieval service, etc.) to the users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications, such as social media applications or the like, may be installed on the terminal devices 110, 120, 130, and 140.

It is to be understood that software applications or services according to the embodiments described herein and/or according to the services provided by the cloud service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that in a case that a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
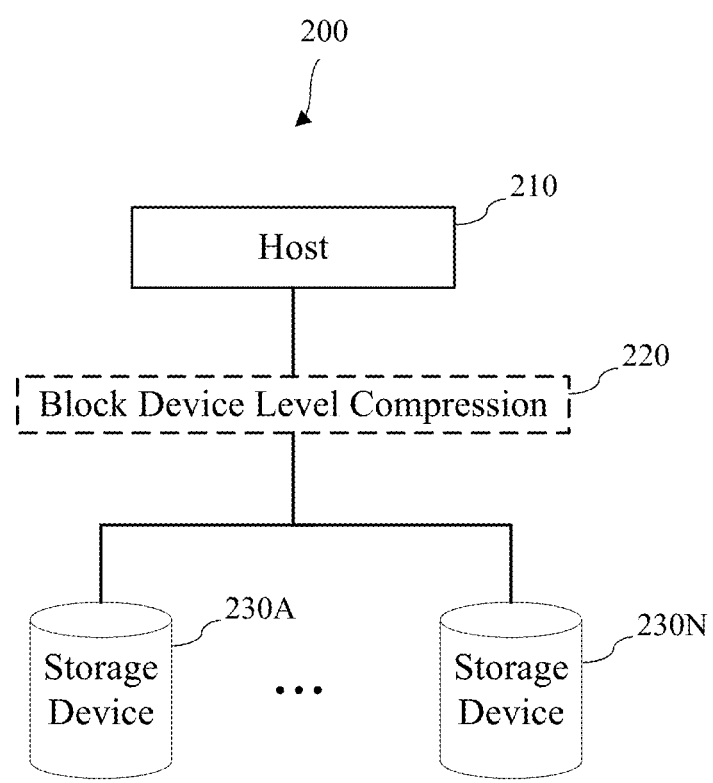
FIG. 2 is a schematic view of an example block storage device control system, arranged in accordance with at least some embodiments described herein.

FIG. 2 is a schematic view of an example block storage device control system 200, arranged in accordance with at least some embodiments described herein.

The system 200 includes a host 210, a block device level compression module 220, and one or more storage devices 230A-230N. In an example embodiment, the host 210 may be the server 150 of FIG. 1. The storage devices 230A-230N may be block storage devices. Uncompressed block addresses (and/or uncompressed data) may be presented to and/or accessible by the host 210, and the compressed data may be stored in a space corresponds to the compressed block addresses for the storage devices 230A-230N.

In an example embodiment, the operations of the block device level compression module 220 may be transparent to the host 210. That is, the host 210 operates, manipulates, reads, writes, stores, or otherwise accesses the uncompressed data (and/or the uncompressed block addresses) with the storage devices 230A-230N via the block device level compression module 220. The host 210 may not be aware of the block device level compression module 220 (1) compressing the uncompressed data to the compressed data, (2) mapping the uncompressed block address to a compressed block address, (3) storing the compressed data in a space corresponds to the compressed block addresses for the storage devices 230A-230N, (4) retrieving the compressed data from the storage devices 230A-230N, and/or (5) decompressing the compressed data to the uncompressed data.

For example, when the host 210 reads data from the storage devices 230A-230N, the host may receive the uncompressed data via the block device level compression module 220. When the host 210 writes data to the storage devices 230A-230N, the host 210 may send the uncompressed data to the block device level compression module 220.

In an example embodiment, the interface between the host 210 and the block device level compression module 220 and/or the interface between the storage devices 230A-230N and the block device level compression module 220 may be e.g., an interface that implements the nonvolatile memory express (NVMe) storage access and transport protocol. It is to be understood that the features of the embodiments disclosed herein may be implemented in the block device level compression module 220. In an example embodiment, the block device level compression module 220 may include one or more components of a computer system 1200 (shown in FIG. 12, discussed below). In an example embodiment, the block device level compression module 220 may include the storage devices 230A-230N. In an example embodiment, the block device level compression module 220 may be in a form of a computer card or the like.

Figure 3A:
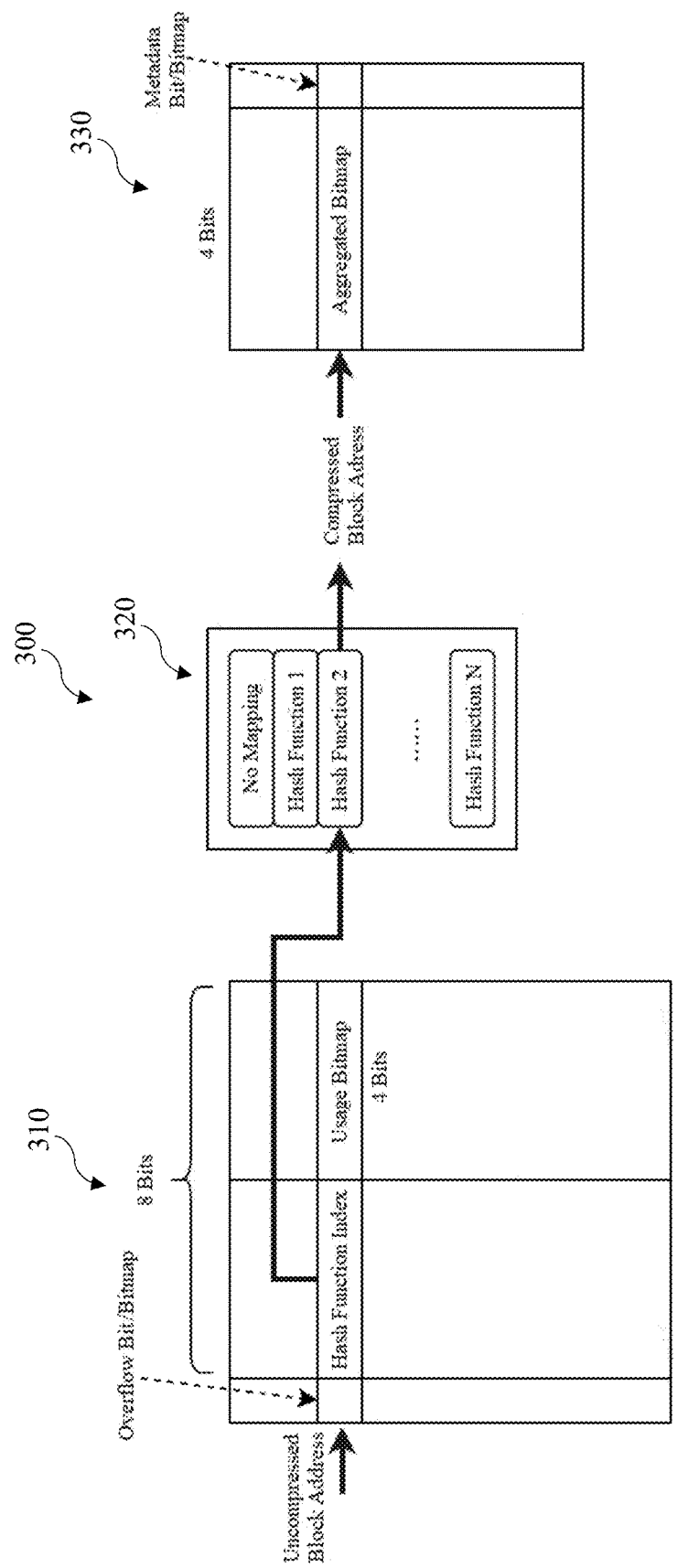
FIG. 3A is a schematic view of an example address mapping sub-system, arranged in accordance with at least some embodiments described herein.

FIG. 3A is a schematic view of an example address mapping sub-system 300, arranged in accordance with at least some embodiments described herein. In an example embodiment, the sub-system 300 may be a part of and/or accessible by the block device level compression module 220 of FIG. 2.

The sub-system 300 includes a flat hash table 310, a set of hash functions (or one hash function with multiple configurations, etc.) 320, and a compressed block allocation table 330. In an example embodiment, the flat hash table 310 and the compressed block allocation table 330 are in-memory tables. That is, the flat hash table 310 and the compressed block allocation table 330 are populated from the metadata on the block storage device and maintained in memory at runtime.

In an example embodiment, the flat hash table 310 may be indexed by the uncompressed block addresses of the uncompressed data that are presented to and/or accessible by the host 210 of FIG. 2. The flat hash table 310 may include a plurality of entries. The number of entries may be equal to the number of the uncompressed block addresses. That is, each uncompressed block address may correspond to an entry of the flat hash table 310. Each entry of the flat hash table 310 includes a hash function index field that contains a hash function index and a usage bitmap field that contains a usage bitmap. In an example embodiment, a size of the hash function index field is 4 bits. A size of the usage bitmap field is 4 bits. See FIG. 3B for the detailed description regarding the usage bitmap field.

It is to be understood that the hash function index indicates which hash function (in a set of hash functions) is used for mapping the uncompressed block address (which is used as the index of the entry of the flat hash table 310) to a compressed block address. If the hash function index is 0 or empty, no mapping is configured. In an example embodiment, up to 15 hash functions may be supported (when a size of the hash function index field is 4 bits).

It is also to be understood that a set of hash functions may be provided. In an example embodiment, the set of hash functions may be pre-defined. The set of hash functions may be provided by or implemented on hardware and/or software. In an example embodiment, the set of hash functions is implemented on a dedicated hardware (e.g., using a physical device and/or electronic circuit as opposed to being done by a computer program) to increase the speed and to lower the energy consumption compared with the software implementation. The set of hash functions may be implemented as (1) a set of different hash functions, or (2) by using one hash function with a plurality of (different) configurations, or (3) a combination of the two implementations. It is to be understood that the requirement for the set of hash functions is that the set of hash functions may generate different mappings from the uncompressed block address space to the compressed block address space. In some example embodiments, the set of hash functions may include a Pearson hashing/hash function, a Fowler-Noll-Vo hash function, and/or a PJW (Peter J. Weinberger) hash function.

It is further to be understood that the index of the set of hash functions may be used as the hash function index of the entry of the flat hash table 310. That is, the value of the hash function index in the flat hash table 310 may correspond to the index of the hash function in the set of hash functions (or the index of the configuration of the hash function in the multiple configurations if one hash function with multiple configurations is used). For example, when the hash function index is one, the first hash function in the set of hash functions (or the hash function with the first configuration) may be used for mapping. When the hash function index is two, the second hash function in the set of hash functions (or the hash function with the second configuration) may be used for mapping. When the hash function index is N, the Nth hash function in the set of hash functions (or the hash function with the Nth configuration) may be used for mapping. When a hash function is executed, the hash function may take the uncompressed block address (i.e., the index of the flat hash table 310 that corresponds to an entry of the flat hash table 310 that contains the hash function index that corresponds to the hash function) as an input, and map the input to an output (i.e., the compressed block address of the compressed data to be stored in the block storage device). It is to be understood that when the hash function index is zero, it indicates that there is no mapping.

Figure 6A:
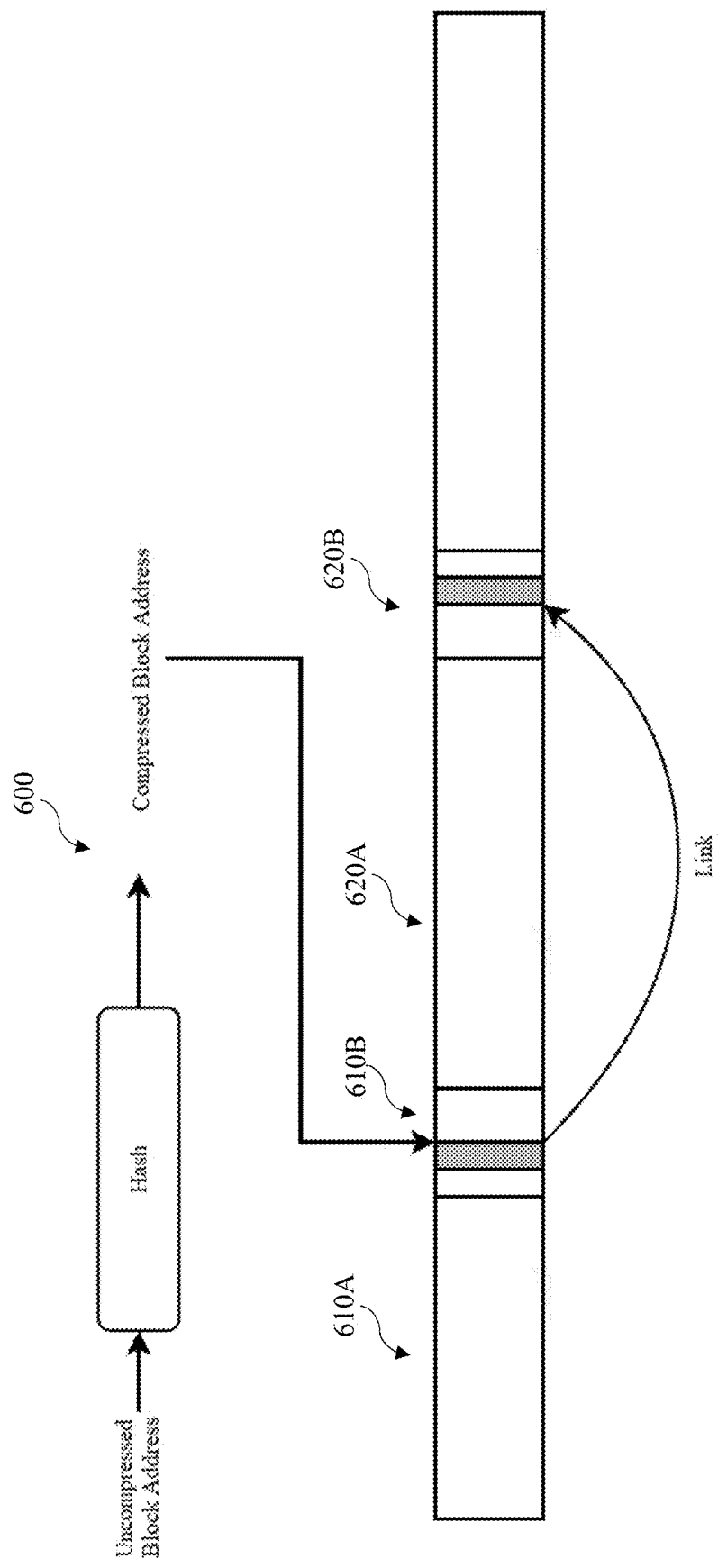
FIG. 6A is a schematic view of an example overflow handling mechanism, arranged in accordance with at least some embodiments described herein.

In an example embodiment, each entry of the flat hash table 310 may include an "overflow" bit indicating whether the storage is overflowed (which may be addressed by e.g., using compressed block address linking or using an overflow area or space, see descriptions of FIGS. 6A and 6B). In another example embodiment, an overflow bitmap separate from and/or independent to the flat hash table 310 may be used to track the status of the overflow. It is to be understood that a bitmap may refer to a representation in which each item corresponds to one or more bits of information.

In an example embodiment, the compressed block allocation table 330 may be indexed by the compressed block addresses for the block storage device. The compressed block allocation table 330 may include a plurality of entries. The number of entries is equal to the number of the compressed block addresses for the block storage device. That is, each compressed block address may correspond to an entry of the compressed block allocation table 330. Each entry of the compressed block allocation table 330 may include an aggregated bitmap field that contains an aggregated bitmap. As shown in FIG. 3A, in an example embodiment, a size of the aggregated bitmap field is 4 bits. See FIG. 3B for the detailed description regarding the aggregated bitmap field.

In an example embodiment, each entry of the compressed block allocation table 330 may include a "metadata" bit indicating whether there is metadata in a space corresponds to the compressed block address in the block storage device (e.g., to avoid or prevent unnecessary metadata reads, see descriptions of FIGS. 6A and 6B). In another example embodiment, a metadata bitmap (instead of a metadata bit) separate from and/or independent to the compressed block allocation table 330 may be used to track the status of the metadata. It is to be understood that a bitmap may refer to a representation in which each item corresponds to one or more bits of information.

In operation, address mapping from the uncompressed block address to a compressed block address includes (1) using the uncompressed block address as the index to locate and retrieve the corresponding entry in the flat hash table 310, (2) obtaining the hash function index in that entry of the flat hash table 310, (3) identifying the corresponding hash function (in the set of hash functions 320) using the hash function index, (4) executing or running the identified hash function, which uses the uncompressed block address as an input, to map the uncompressed block address to a compressed block address (e.g., generating the compressed block address by the hash function). It is to be understood that the above process may be partially or fully accelerated by hardware (e.g. by inputting the uncompressed block address and the hash function index to the hardware, and the hardware outputting the compressed block address).

Figure 3B:
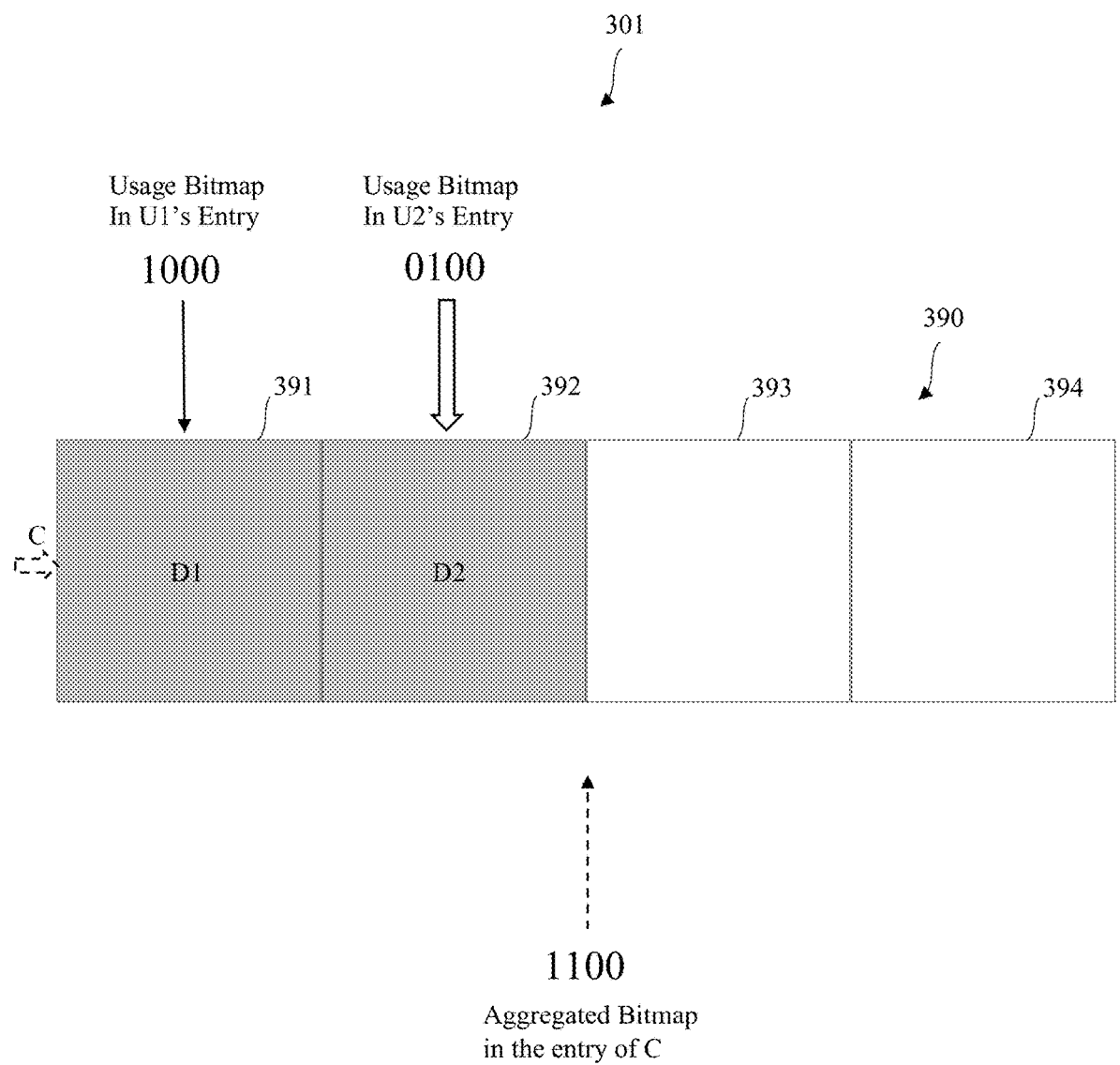
FIG. 3B is a schematic view of an example compressed block, arranged in accordance with at least some embodiments described herein.

FIG. 3B is a schematic view 301 of an example compressed block 390, arranged in accordance with at least some embodiments described herein. In an example embodiment, the block 390 may be a block (e.g., a compressed block) in the block storage device to store the compressed data, and may correspond to a compressed block address.

In an example embodiment, an uncompressed block address U1 may be mapped to the compressed block address C that corresponds to the block 390 in the block storage device. Assuming the uncompressed data corresponding to the uncompressed block address U1 has a size of 4 KB and the compression ratio (a size of the uncompressed data compared with a size of the compressed data) is 4:1, the compressed data D1 to be saved in the compressed block address C may have a size of 1 KB. It is to be understood that the usage of a block and/or blocks on the block storage device (e.g., on a disk, etc.) may be tracked in slivers (e.g., a sub-block, in units of 1 KB, etc.) That is, for the uncompressed data (4 KB) corresponding to the uncompressed block address U1, which is mapped to the compressed block address C using a hash function, the usage bitmap (in the entry of the flat hash table 310 indexed by the uncompressed block address U1) may be "1000", indicating that the first sliver 391 of the block 390 is used by the compressed data D1 (compressed from the uncompressed data (4 KB) corresponding to the uncompressed block address U1), and the remaining three slivers (392, 393, 394) are not used by the compressed data D1.

Similarly, assuming the uncompressed data corresponding to the uncompressed block address U2 has a size of 4 KB and the compression ratio is 4:1, the compressed data D2 to be stored in the compressed block address C may have a size of 1 KB. For the uncompressed data (4 KB) corresponding to the uncompressed block address U2, which may also be mapped to the compressed block address C (since the address C still has free slivers or space) using a hash function, the usage bitmap (in the entry of the flat hash table 310 indexed by the uncompressed block address U2) may be "0100", indicating that the second sliver 392 of the block 390 is used by the compressed data D2 (compressed from the uncompressed data (4 KB) corresponding to the uncompressed block address U2), and the remaining three slivers (391, 393, 394) are not used by the compressed data D2.

That is, the usage bitmap of the entry of the flat hash table 310 may refer to a bitmap tracking the usage of the space (e.g., a block, etc.) that corresponds to the compressed block address for the block storage device. In an example embodiment, the usage of the blocks on the block storage device (e.g., a disk, etc.) may be tracked in slivers. Each bit of the usage bitmap may represent one sliver in the block (that corresponds to the mapped compressed block address) on the block storage device. It is to be understood that the size of a sliver described above is for illustration purpose only and is not limited to the example(s).

The aggregated bitmap (e.g., in an entry of the compressed block allocation table 330 corresponding to the compressed block address C) may track an aggregated usage of the compressed block address C. For example, when two uncompressed block addresses (U1 and U2) are mapped to a same compressed block address C, the aggregated bitmap field of the entry of the compressed block allocation table 330 corresponding to the compressed block address C may be a result of a bitwise "OR" operation of the usage bitmaps for U1 and U2. In the example shown in FIG. 3B, the aggregated bitmap may be "1100", indicating that for block 390, the first and second slivers (391, 392) are aggregately used, and the remaining two slivers (393, 394) are not used and are free to use or be allocated.

It is to be understood that in an example embodiment, for each uncompressed block address (for a 4 KB block), one byte (for the hash function index and the usage bitmap) may be used for an entry of the flat hash table 310, and one bit (for the overflow bit or bitmap) may be used (e.g., for the overflow bit in the entry of the flat hash table 310, or for an overflow bitmap separate from the flat hash table 310). For each compressed block address (for a 4 KB block), 0.5 byte (for the aggregated bitmap) may be used for an entry of the compressed block allocation table 330, and one bit (for the metadata bit or bitmap) may be used (e.g., for the metadata bit in the entry of the compressed block allocation table 330, or for a metadata bitmap separate from the compressed block allocation table 330). Assuming the uncompressed block address space is two times of the compressed block address space, the overall memory usage of the address mapping mechanism (for the tables and/or the bits or bitmaps described in FIG. 3A) described herein may be 1.4375 bytes per a 4 KB uncompressed block address space, or 0.035% of the uncompressed block address space. If the uncompressed block address space is 64 TB, the memory usage for the address mapping mechanism described herein may be 23 GB. It is also to be understood that a flat mapping table scheme may require about 128 GB of memory (or about 0.15%-0.2% of the uncompressed block address space) to manage the same 64 TB space. Features in the embodiments disclosed herein may significantly reduce the memory usage compared with the flat mapping table scheme.

Figure 4:
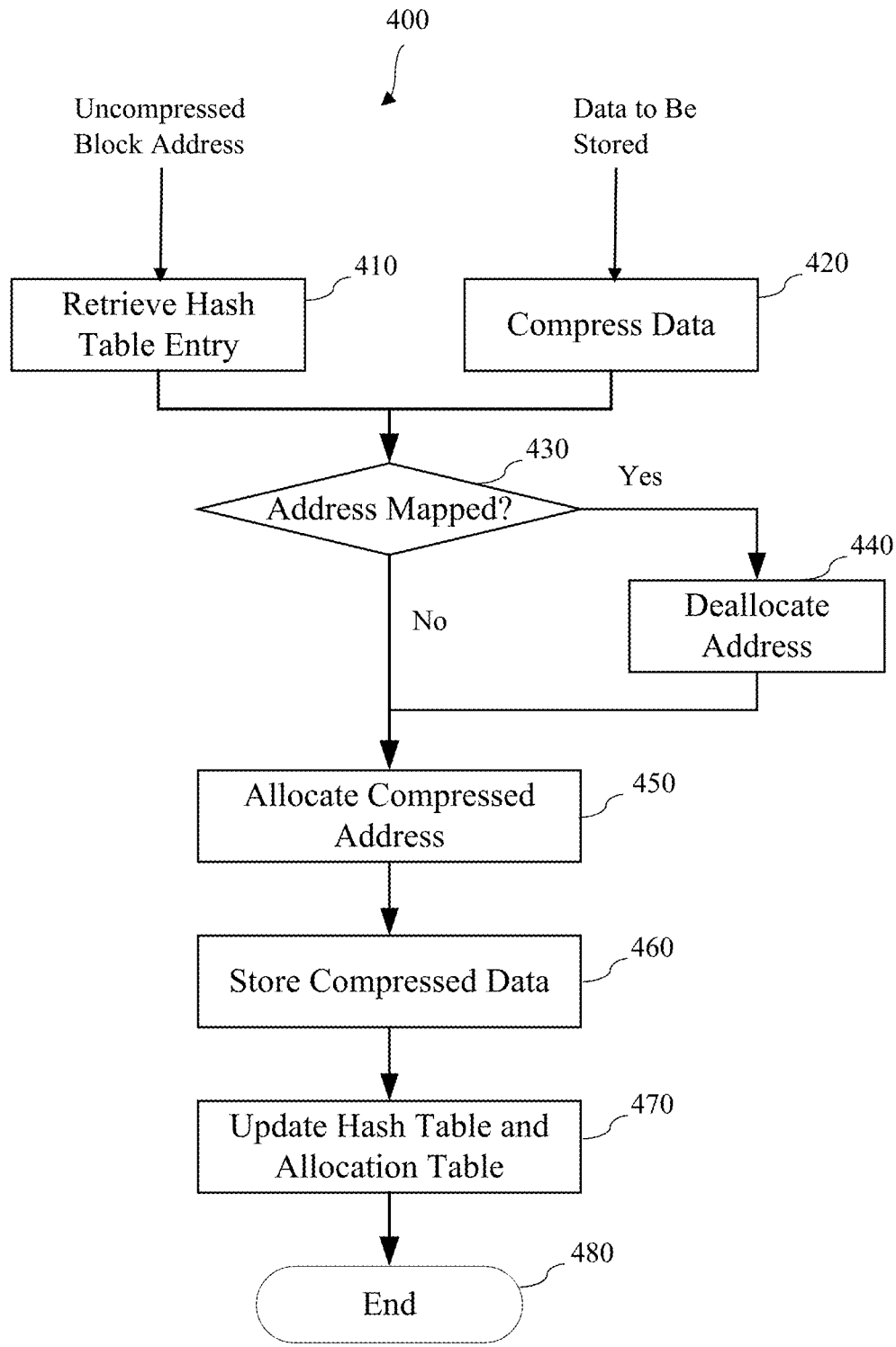
FIG. 4 is a flow chart illustrating an example write processing flow of block device level compression mapping using a flat hash table, in accordance with at least some embodiments described herein.

FIG. 4 is a flow chart illustrating an example write processing flow 400 of block device level compression mapping using a flat hash table, in accordance with at least some embodiments described herein.

Figure 12:
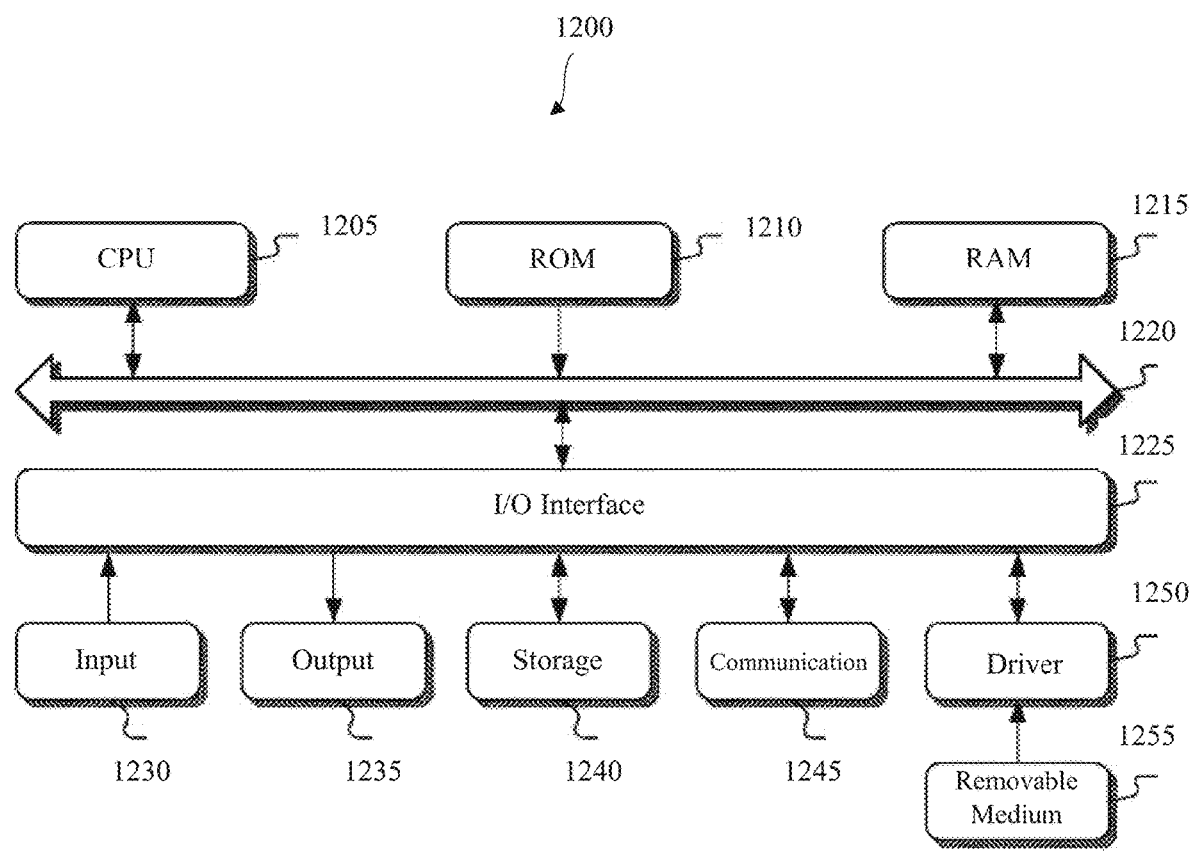
FIG. 12 is a schematic structural diagram of an example computer system applicable to implementing an electronic device, arranged in accordance with at least some embodiments described herein.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 1205 of FIG. 12, a processor of the block device level compression module 220 of FIG. 2, and/or any other suitable processor), unless otherwise specified.

It is also to be understood that the processing flow 400 can include one or more operations, actions, or functions as illustrated by one or more of blocks 410, 420, 430, 440, 450, 460, 470, and 480. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized, the flat hash table 310 (and/or the overflow bitmap) and the compressed block allocation table 330 (and/or the metadata bitmap) of FIG. 3A may be populated (e.g., from the metadata on the block storage device and/or update journal after power loss) into the memory and/or maintained in memory at runtime, etc. Processing flow 400 may begin at block 410 or block 420. It is also to be understood that the data to be stored or written (the uncompressed data) and/or the uncompressed block address may be received from the host (e.g., the server 150 of FIG. 1). The processing flow 400 may be transparent to the host and/or the application (that requests the write process) that is run on the host.

At block 410 (Retrieve Hash Table Entry), the processor may retrieve or obtain the content of an entry of the flat hash table (e.g., the flat hash table 310 of FIG. 3A) using the uncompressed block address (of the uncompressed data) as the index of the flat hash table to locate the entry. It is to be understood that the uncompressed block address is the address that is presented to or accessible by the host. Each uncompressed block address may correspond to an entry of the flat hash table, which may be indexed using the uncompressed block address.

At block 420 (Compress Data), the processor may compress the data to be stored (the uncompressed data) to compressed data e.g., using a compression algorithm or the like.

It is to be understood that the operations or functions described in block 410 and/or block 420 may be performed or executed in parallel or one after the other. Processing may proceed from block 410 and/or block 420 to block 430.

At block 430 (Address Mapped?), the processor may determine whether the uncompressed block address has been mapped to a compressed block address. The existence of a mapping is indicated by a non-empty or non-zero entry of the flat hash table retrieved or obtained at block 410. An empty or zero entry of the flat hash table may indicate that there is no mapping. It is to be understood that for an empty block storage device (e.g., prepared for its first use), all entries of the flat hash table may be empty (e.g., initialized as zeros, etc.) indicating that no uncompressed block address is mapped to any compressed block address. That is, the hash function index of the entry may be zero (indicating "no mapping"), the usage bitmap of the entry may be zero (indicating no usage of the block(s) in the block storage device), and/or the overflow bit or bitmap may be zero (indicating no overflow, see descriptions of FIGS. 6A and 6B). When the uncompressed block address is not mapped to a compressed block address (e.g., an empty entry of the flat hash table), processing may proceed from block 430 to block 450. When the uncompressed block address is currently mapped to a compressed block address (e.g., non-empty entry), processing may proceed from block 430 to block 440.

At block 440 (Deallocate Address), the processor may deallocate the mapping (which may indicate a used space in the block storage device, and which may be a non-existing or unused mapping) of the uncompressed block address. In an example embodiment, deallocating the mapping of the uncompressed block address includes (1) locating an entry of the compressed block allocation table (e.g., the compressed block allocation table 330 of FIG. 3A). The entry of the compressed block allocation table is indexed by and may be determined by using the compressed block address mapped from the uncompressed block address by executing the hash function that corresponds to the hash function index in the entry of the flat hash table. Deallocating the mapping of the uncompressed block address also includes (2) updating the aggregated usage bitmap of the entry of an allocation table based on the usage bitmap of the entry of the flat hash table (e.g., by clearing the bit(s) associated with the usage bitmap from the aggregated usage bitmap, etc.), and (3) clearing the hash function index and the usage bitmap of the entry of the flat hash table.

It is to be understood that deallocating the mapping of the uncompressed block address may further include deallocating the linked compressed block address (see descriptions of FIG. 6A) and clearing the overflow bit or bitmap and/or the metadata bit or bitmap, if the tables (the flat hash table and/or the compressed block allocation table) and/or other information indicate that there is a linked compressed block address. Deallocating the mapping of the uncompressed block address may also include deallocating the overflow area or space (see descriptions of FIG. 6B) and clearing the overflow bit or bitmap and/or the metadata bit or bitmap, if the tables (the flat hash table and/or the compressed block allocation table) and/or other information indicate that the overflow area or space is used. Processing may proceed from block 440 to block 450.

At block 450 (Allocate Compressed Address), the processor may allocate a space that corresponds to a compressed block address mapped from the uncompressed block address. In an example embodiment, allocating the space that corresponds to the compressed block address includes executing or performing a set of hash functions (e.g., the set of hash functions in 320 of FIG. 3A) using the uncompressed block address as an input. Allocating the space that corresponds to the compressed block address also includes determining a hash function, among the set of hash functions, so that the hash function has a mapping to a compressed block address with enough free slivers or space in the block storage device for the compressed data. It is to be understood that when there are multiple hash functions (in the set of hash functions) that have a mapping to a compressed block address with enough free slivers or space for the compressed data, the hash function that has the mapping corresponding to the least amount of free slivers or space (e.g., the free space is less than or equal to any space that corresponds to a mapped compressed block address using any one of the set of hash functions other than the hash function, and the free space is sufficient to store the compressed data) among the multiple hash functions may be chosen, e.g., to minimize fragmentation. It is also to be understood that when no hash function has a mapping to a compressed block address with enough free slivers or space for the compressed data (e.g., when the block storage device is almost full), overflow may be handled by the processor. See the descriptions of FIGS. 6A and 6B. Processing may proceed from block 450 to block 460. It is to be understood that once the hash function is determined, the compressed block address can be determined (e.g., by mapping from the uncompressed block address using the determined hash function), and the corresponding free slivers or space may be allocated.

At block 460 (Store Compressed Data), the processor may store or write the compressed data (from block 420) to the mapped compressed block address (allocated or identified at block 450). Processing may proceed from block 460 to block 470.

At block 470 (Update Hash Table and Allocation Table), the processor may update the flat hash table by (1) writing or storing an index of the hash function (in the set of hash functions) that is identified at block 450 to the hash function index of the entry of the flat hash table, and (2) writing or storing the usage bitmap information based on a size of the compressed data (from block 420), where the size of the compressed data may indicate how many slivers or space in the block(s) of the compressed block address may be used by the compressed data. The processor may also update the compressed block allocation table by writing or storing the aggregated bitmap information based on the previous aggregated bitmap information and the usage bitmap information. If there is no previous aggregated bitmap information, the usage bitmap information may be used as the aggregated bitmap. If there is previous aggregated bitmap information, a bitwise "OR" operation of the previous aggregated bitmap information and the usage bitmap information may be performed and the resultant information may be used as the aggregated bitmap. Processing may proceed from block 470 to block 480.

At block 480 (End), the processor may end the write processing flow 400 and/or report to the host that the write process is completed.

Figure 5:
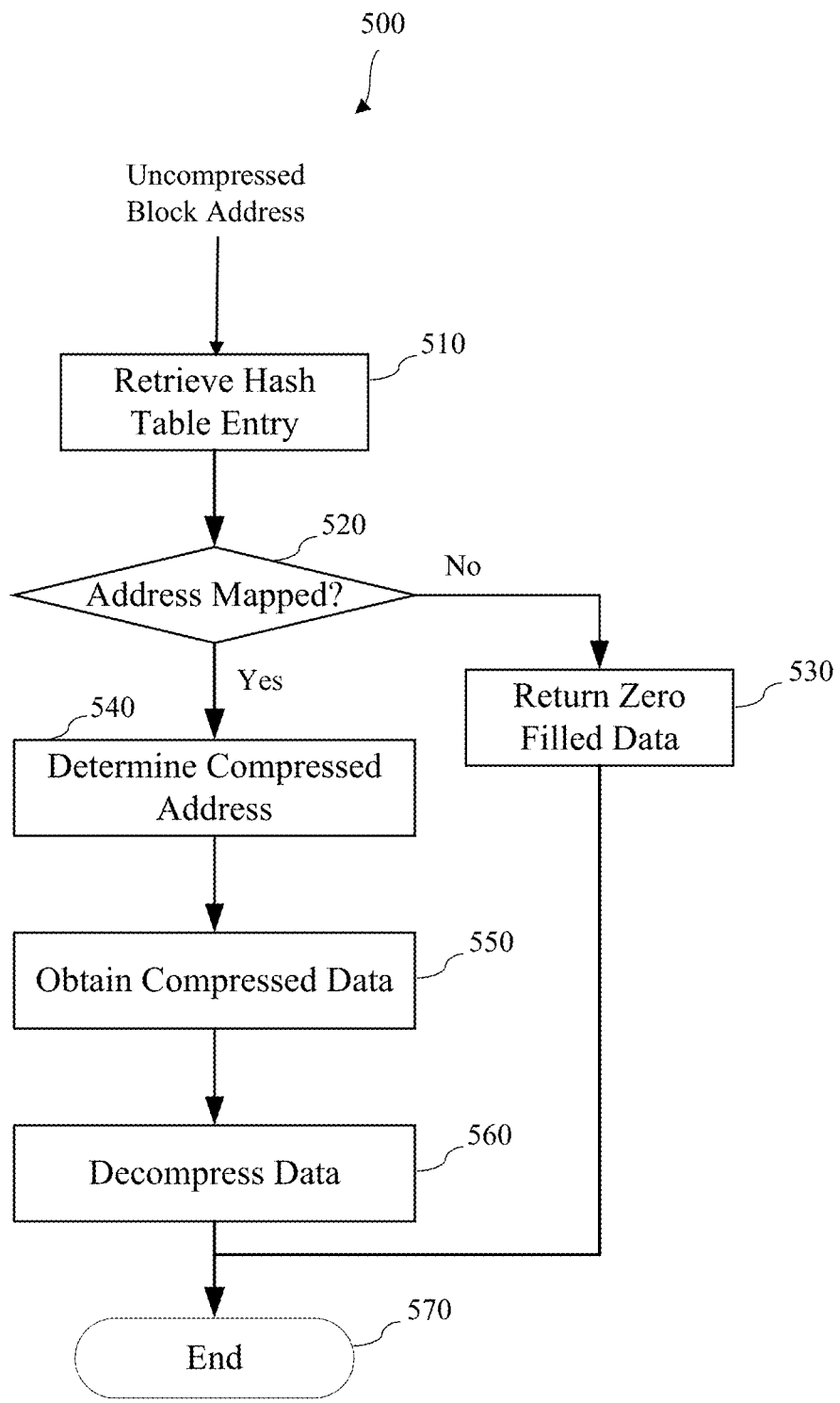
FIG. 5 is a flow chart illustrating an example read processing flow of block device level compression mapping using a flat hash table, in accordance with at least some embodiments described herein.

FIG. 5 is a flow chart illustrating an example read processing flow 500 of block device level compression mapping using a flat hash table, in accordance with at least some embodiments described herein.

It is to be understood that the processing flow 500 disclosed herein can be conducted by one or more processors (e.g., the processor of one or more of the terminal device 110, 120, 130, and 140 of FIG. 1, the processor of the server 150 of FIG. 1, the central processor unit 1205 of FIG. 12, a processor of the block device level compression module 220 of FIG. 2, and/or any other suitable processor), unless otherwise specified.

It is also to be understood that the processing flow 500 can include one or more operations, actions, or functions as illustrated by one or more of blocks 510, 520, 530, 540, 550, 560, and 570. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 500, operations including initializations or the like may be performed. For example, system parameters and/or application parameters may be initialized, the flat hash table 310 (and/or the overflow bitmap) and the compressed block allocation table 330 (and/or the metadata bitmap) of FIG. 3A may be populated (e.g., from the metadata on the block storage device and/or update journal after a power loss) into the memory and/or maintained in the memory at runtime, etc. Processing flow 500 may begin at block 510. It is also to be understood that the uncompressed block address may be received from the host (e.g., the server 150 of FIG. 1). The processing flow 500 may be transparent to the host and/or the application (that requests the read process) that is run on the host.

At block 510 (Retrieve Hash Table Entry), the processor may retrieve or obtain the content of an entry of the flat hash table (e.g., the flat hash table 310 of FIG. 3A) using the uncompressed block address as the index of the flat hash table to locate the entry. It is to be understood that the uncompressed block address is the address that presented to, received from, and/or accessible by the host. Each uncompressed block address may correspond to an entry of the flat hash table, which is indexed using the uncompressed block address. Processing may proceed from block 510 to block 520.

At block 520 (Address Mapped?), the processor may determine whether the uncompressed block address has been mapped to a compressed block address. It is to be understood that the existence of a mapping may be indicated by a non-empty or non-zero entry of the flat hash table retrieved or obtained at block 510. An empty or zero entry of the flat hash table may indicate that there is no mapping. That is, the hash function index of the entry may be zero (indicating "no mapping"), the usage bitmap of the entry may be zero (indicating no usage of the block(s) in the block storage device), and/or the overflow bit or bitmap may be zero (indicating no overflow, see descriptions of FIGS. 6A and 6B). When the uncompressed block address is not mapped to a compressed block address (e.g., an empty entry of the flat hash table, or the hash function index is zero in the entry of the hash function table), processing may proceed from block 520 to block 530. When the uncompressed block address is currently mapped to a compressed block address (e.g., non-empty entry), processing may proceed from block 520 to block 540.

At block 530 (Return Zero-Filled Data), the processor may return a zero-filled buffer or data to the host (e.g., to the application (that requests the read process) that is run on the host, etc.), to indicate a read error or the like. Processing may proceed from block 530 to block 570.

At block 540 (Determine Compressed Address), the processor may determine the compressed block address by (1) identifying the hash function in the set of hash functions based on the hash function index in the entry of the flat hash table, and (2) executing the hash function using the uncompressed block address as the input to map the uncompressed block address to a compressed block address (and/or to obtain or generate or determine the compressed block address as the output). Processing may proceed from block 540 to block 550.

At block 550 (Obtain Compressed Data), the processor may obtain, read, or retrieve the compressed data from the space in the block storage device that corresponds to the compressed block address. Processing may proceed from block 550 to block 560.

At block 560 (Decompress Data), the processor may decompress the compressed data from block 550 to uncompressed (or decompressed) data using e.g., a compression/ decompression algorithm or the like. Processing may proceed from block 560 to block 570.

At block 570 (End), the processor may end the read processing flow 500 and/or report to the host that the read process is completed by e.g., returning the decompressed data from block 560 or the zero-filled data from block 530 to the host (or to the application that is run on the host, to e.g., indicate an error).

FIG. 6A is a schematic view of an example overflow handling mechanism 600, arranged in accordance with at least some embodiments described herein. FIG. 6B is a schematic view of another example overflow handling mechanism 601, arranged in accordance with at least some embodiments described herein.

It is to be understood that "overflow" may refer to a situation that for an uncompressed block address (of uncompressed data), none of the hash functions in the set of hash functions may find a mapping (to a compressed block address) with enough free slivers or space on the block storage device to store the compressed data (e.g., in the operations at block 450 of FIG. 4). It is also to be understood that when the block storage device (e.g., a disk, a compressed block address space in the disk, etc.) is not very full, overflow may rarely happen since multiple hash functions are executed to find the mapping on the block storage device for storing the compressed data (see e.g., description of block 450 of FIG. 4). It is further to be understood that when the block storage device is close to full, the probability of overflow may increase.

FIG. 6A shows an example overflow handling mechanism—address linking. In an example embodiment, when the overflow occurs (i.e., none of the hash functions in the set of hash functions may find a mapping (to a compressed block address) with enough free slivers or space to store the compressed data), the hash function that has a mapping (to a compressed block address) with the most free slivers or space may be chosen, and its index may be saved in the entry of the flat hash table. In the write process flow, the processor may split the compressed data into multiple parts (e.g., in a same or variable length), store the split parts in multiple compressed block addresses, and link the split parts together using e.g., link(s). The link(s) may be stored in a metadata area of the block (e.g., provided on the block storage device), or as a part of the (split) compressed data (e.g. in a header of the (split) compressed data).

As shown in FIG. 6A, the compressed data may be split into two or more parts (610A and 620A). In an example embodiment, 610B is the header of the split compressed data 610A and includes a link to the split compressed data 620A (linking to the header 620B). 620B is the header of the split compressed data 620A and includes either (1) a link to the next split compressed data, or (2) a link value indicating that no more split compressed data is linked. In another example embodiment, 610B is the metadata area or space of the block(s) corresponding to the split compressed data 610A and includes a link to the split compressed data 620A (linking to the metadata area or space 620B). 620B is the metadata area or space of the block(s) corresponding of the split compressed data 620A and includes either (1) a link to the next split compressed data, or (2) a link value indicating that no more split compressed data is linked.

FIG. 6B shows another example overflow handling mechanism—overflow area or space. In an example embodiment, the processor may reserve a small portion of the physical space (compressed block address space) for the overflow data, and such portion may be referred to as an overflow area or space. If address linking mechanism fails, the split compressed data may be stored in the overflow area and linked with link(s). When the compressed block is full, the link(s) may be saved in the metadata area of the compressed block.

As shown in FIG. 6B, the compressed data may be split into two or more parts (610A and 690A). In an example embodiment, 610B is the header of the split compressed data 610A and includes a link to the split compressed data 690A (linking to the header 690B). 690B is the header of the split compressed data 690A and includes either (1) a link to the next split compressed data, or (2) a link value indicating that no more split compressed data is linked. In another example embodiment, 610B is the metadata area or space of the block(s) corresponding to the split compressed data 610A and includes a link to the split compressed data 690A (linking to the metadata area or space 690B). 690B is the metadata area or space of the block(s) corresponding of the split compressed data 690A and includes either (1) a link to the next split compressed data, or (2) a link value indicating that no more split compressed data is linked. It is to be understood that 690A and 690B are stored in the overflow area or space specifically reserved for the overflow data.

It is also to be understood that if both the address linking mechanism and the overflow area mechanism fail, the write request/process fails and the processor reports an error indicating "disk full" to the host (or to the application that requests the write process).

It is further to be understood that when overflow occurs, in the write process, the overflow bit or bitmap may be updated to indicate the overflow. If the compressed block address has metadata (e.g., that includes the link(s) to the next split compressed data, etc.), in the write process, the metadata bit or bitmap may be updated to indicate that the compressed block address has metadata. Accordingly, in the write process, when deallocating the address (in block 440 of FIG. 4), the area or space having the split compressed data (and/or its header or metadata) may be deallocated based on the overflow bit or bitmap and/or the metadata bit or bitmap (and/or the header or metadata of the split compressed data). Accordingly, in the read process, when reading the compressed data (e.g., at block 550 of FIG. 5), the overflow bit or bitmap and/or the metadata bit or bitmap (and/or the header or metadata of the split compressed data) may be checked to ensure that all the split compressed data are read.

In an example embodiment, the processor may perform power loss protection to protect the integrity of the block device level compression mapping process. For example, the flat hash table, the overflow bit or bitmap, and/or the metadata bit or bitmap need to be persistent so that during or after a power loss, the processor may preserve the status of the mapping and/or restore the correct mappings on next startup. It is to be understood that the aggregated bitmap in the compressed block allocation table may be derived from the flat hash table, and thus the allocation table do not need to be persistent.

In an example embodiment, an "update journal" may be used for recording the updates to the flat hash table, the overflow bit or bitmap, and/or the metadata bit or bitmap. The update journal may be power loss protected (e.g. by using a capacitor on the block device level compression module or computer card). Whenever the flat hash table, the overflow bit or bitmap, and/or the metadata bit or bitmap is updated, the event is recorded in the "update journal". When the "update journal" becomes full or near full (e.g., the usage of the update journal is above a certain threshold), the current snapshot of the flat hash table, the overflow bit or bitmap, and/or the metadata bit or bitmap may be written to or backed-up in the block storage device (e.g., a disk, etc.) to free up entries in the "update journal". The backup process may be performed in a progressive manner to minimize the impact on user's inputs/outputs. In the event of power loss, the mapping may be restored at the next power on by e.g., (1) reading or retrieving the snapshot of the flat hash table, the overflow bit or bitmap, and/or the metadata bit or bitmap from the block storage device (e.g., the disk, etc.), and (2) replaying the events recorded in the "update journal" to restore the latest state of the flat hash table, the overflow bit or bitmap, and/or the metadata bit or bitmap.

It is to be understood that features in the embodiments disclosed herein provide a hybrid design of transparent block (storage) device level compression mapping using a flat hash table. A flat hash table may be used to track the critical information of each uncompressed block address in memory, so that for most of the input/output requests, there is no need to read the critical information from the disk (e.g., the block storage device). Instead of storing the compressed block address, a 4-bit index of the hash function for each uncompressed block address may be stored in the flat hash table. The index may indicate which hash function is used for mapping the uncompressed block address. As such, the memory usage may be lowered by almost a magnitude compared with existing schemes, making the block device level compression mapping scheme cost effective and feasible for production. In the schemes disclosed herein, an uncompressed block address may be mapped to a compressed block address using the hash function indicated by the hash index in the flat hash table entry. Since the uncompressed block address space is larger than the compressed block address space, multiple uncompressed block addresses may be mapped to a same compressed block address.

It is also to be understood that features in the embodiments disclosed herein may provide better performance than other existing schemes. The flat hash table may provide precise or near precise mapping for a given uncompressed block address, eliminating the need for multiple attempts to map the uncompressed block address to a compressed block address. As such, there may be no extra latency for most of the inputs/outputs, e.g., during reading and/or writing. Features in the embodiments disclosed herein may also require less cost than other existing schemes. There is no need to require a large dynamic random-access memory (DRAM) for the mapping table. The flat hash table is about 0.03% of the uncompressed address space, almost a magnitude lower than any existing schemes. For example, about 23 GB of DRAM for managing 64 TB of uncompressed space may be needed for the block device level compression mapping scheme, while 128 GB of memory may be required for the existing schemes. Features in the embodiments disclosed herein may further provide less complexity than other existing schemes. Critical information management may be simplified when using the flat hash table. Also, features in the embodiments disclosed herein may provide better scalability than other existing schemes. The performance of the block device level compression mapping design may only be limited by the fullness of the disks (e.g., the block storage devices) instead of their capacity.

Figure 7:
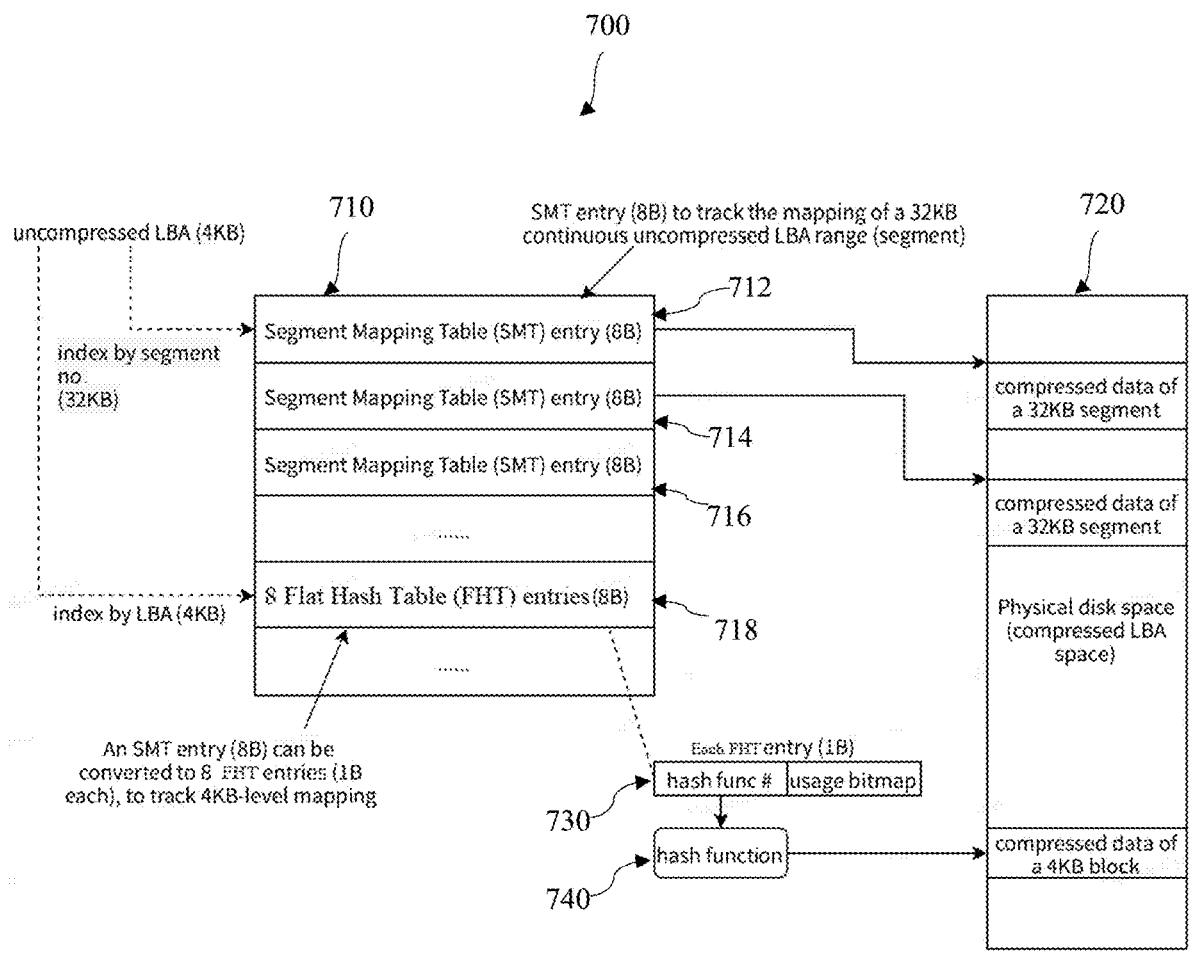
FIG. 7 is a schematic view of another example address mapping sub-system, arranged in accordance with at least some embodiments described herein.

FIG. 7 is a schematic view of another example address mapping sub-system 700, arranged in accordance with at least some embodiments described herein. In an example embodiment, the sub-system 700 may be a part of and/or accessible by the block device level compression module 220 of FIG. 2.

The sub-system 700 includes a mapping table 710. It is to be understood that the mapping table 710 may be a single table shared by a segment mapping mode (see FIGS. 7-11 for detailed description about the segment mapping mode) and a flat hash table mapping mode (see FIGS. 3A-6B for detailed description about the flat hash table mapping mode). In an example embodiment, the mapping table 710 is an in-memory table. That is, the mapping table 710 may be populated from the metadata on the block storage device and maintained in memory at runtime.

In an example embodiment, when the segment mapping mode is used, the mapping table 710 may be indexed by the segment number of the uncompressed data that are presented to and/or accessible by the host 210 of FIG. 2. In an example embodiment, each segment or segment number of the uncompressed data may contain or store 32 KB data (e.g., eight 4 KB blocks). Each uncompressed logical block address (LBA) may correspond to a space containing or storing 4 KB data. When the segment mapping mode is used, the mapping table 710 may include a plurality of segment mapping table (SMT) entries. In an example embodiment, when only the segment mapping mode is used, the mapping table 710 may become a SMT (which may be a flat mapping table), and the number of SMT entries may be equal to the number of the segments. That is, each segment (or segment number) may correspond to an SMT entry. Each SMT entry may have a size of 8B (or other suitable size). See FIG. 8 for detailed description about the SMT entry.

In an example embodiment, when the flat hash table mapping mode is used, the mapping table 710 may be indexed by the uncompressed logical block addresses (LBAs) of the uncompressed data that are presented to and/or accessible by the host 210 of FIG. 2. In an example embodiment, each uncompressed logical block address may correspond to a space containing or storing 4 KB data. When the flat hash table mapping mode is used, the mapping table 710 may include a plurality of flat hash table (FHT) entries. In an example embodiment, when only the flat hash table mapping mode is used, the mapping table 710 may become a FHT (see FIG. 3A), and the number of FHT entries may be equal to the number of the uncompressed LBAs. That is, each uncompressed LBA may correspond to an FHT entry. Each FHT entry 730 may have a size of 1 B (or other suitable size). Each FHT entry 730 includes a hash function index field that contains a hash function index and a usage bitmap field that contains a usage bitmap. It is to be understood that the hash function index of the FHT entry 730 indicates which hash function 740 (in a set of hash functions) may be used for mapping the uncompressed LBA to a compressed LBA. See FIG. 3A for detailed description about the FHT entry. It is also to be understood that a compressed block allocation table (not shown, see 330 of FIG. 3A) can be used in the flat hash table mapping mode.

It is to be understood that embodiments disclosed herein may adapt to the workload's read/write (or I/O) pattern (i.e., the host's read/write or I/O request pattern) by dynamically switching between the segment mapping mode and the flat hash table mapping mode. In an example embodiment, one SMT entry may have a size of eight FHT entries. As shown in FIG. 7, the entries 712, 714, and 716 of the mapping table 710 are SMT entries, and the entry 718 of the mapping table 710 is FHT entries (eight FHT entries). That is, for entries 712, 714, and 716, the segment mapping mode is used, and each entry is used to map a 32 KB segment from the uncompressed address space to a compressed address space in the block device 720 (e.g., the physical disk space or the compressed LBA space). For the entry 718 (the eight FHT entries), the flat hash table mapping mode is used, and each entry is used to map a 4 KB block from the uncompressed address space to the compressed address space in the block device 720 (e.g., the physical disk space or the compressed LBA space). In either the segment mapping mode or the flat hash table mapping mode, the workload (i.e., the uncompressed data that are presented to and/or accessible by the host 210 of FIG. 2) is compressed (e.g., by the block device level compression module 220 of FIG. 2) and saved in the block device 720 during a write process. The compressed data in the block device 720 can be decompressed (e.g., by the block device level compression module 220 of FIG. 2) and sent to or received by the host 210 of FIG. 2 during a read process.

Figure 8:
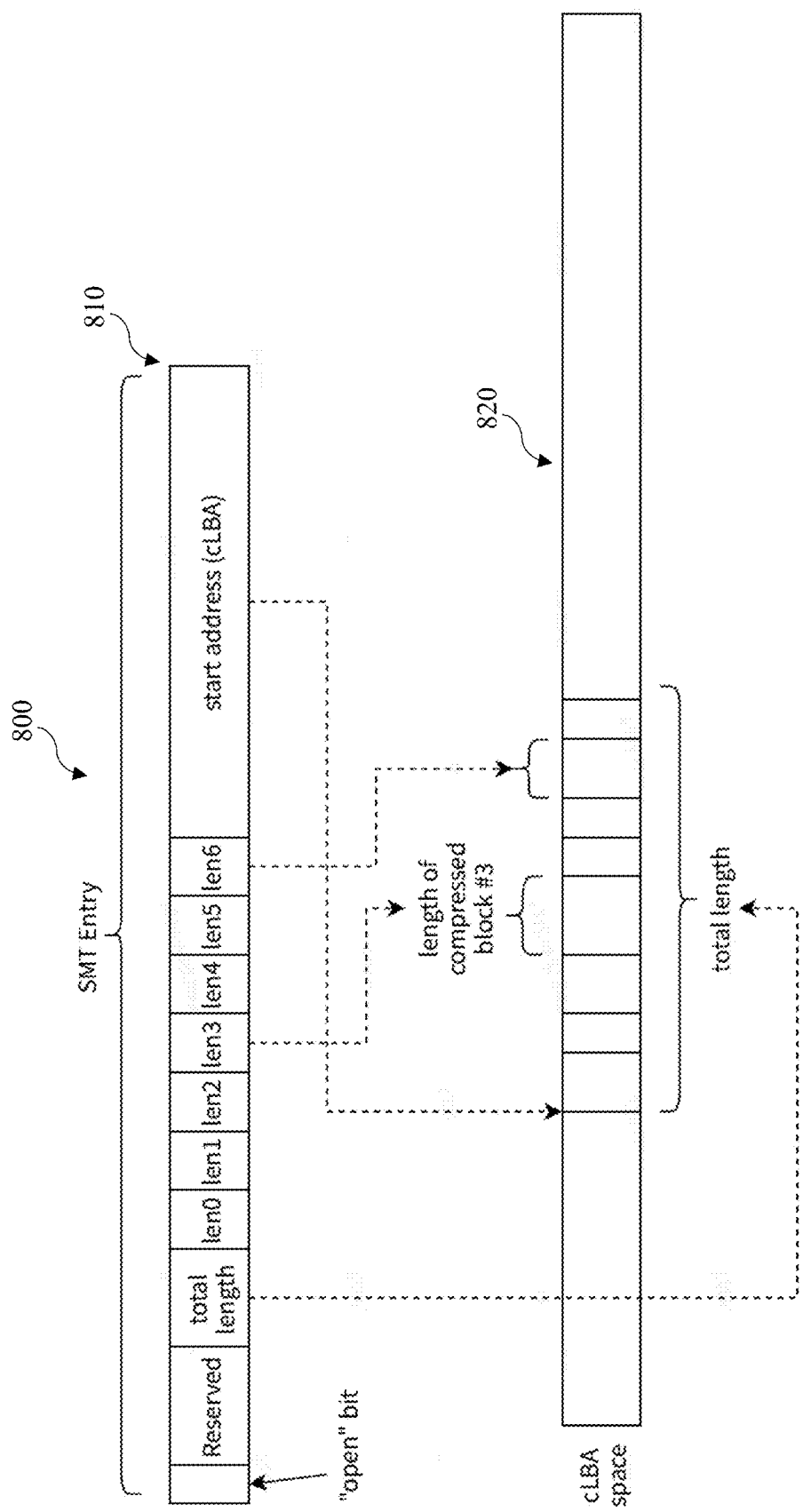
FIG. 8 is a schematic view of an example address mapping using a segment mapping table entry, arranged in accordance with at least some embodiments described herein.

FIG. 8 is a schematic view of an example address mapping 800 using a segment mapping table entry, arranged in accordance with at least some embodiments described herein. It is to be understood that when an SMT entry is used for address mapping, the address mapping sub-system is in the segment mapping mode. When an FHT entry is used for address mapping, the address mapping sub-system is in the segment mapping mode.

As shown in FIG. 8, each SMT entry 810 (e.g., having a size of 8 B or the like) includes an open flag, a reserved field, a total length field, a first length field (len0), a second length field (len1), a third length field (len2), a fourth length field (len3), a fifth length field (len4), a sixth length field (len5), a seventh length field (len6), and a starting address field. The SMT entry 810 is used to map the uncompressed LBA (or the corresponding segment) to the compressed LBA in the block device 820 (the compressed LBA space). It is to be understood that one or more of the first length field (len0), the second length field (len1), the third length field (len2), the fourth length field (len3), the fifth length field (len4), the sixth length field (len5), and the seventh length field (len6) may be optional.

In an example embodiment, the open flag can have a size of 1 bit. The open flag is configured to indicate whether the segment (that corresponds to the SMT entry) is open or closed. If the open flag is set, then the segment is "open" or being filled up (e.g., by the host 210 of FIG. 2). For an open segment, the compressed size of the segment is unknown yet. Therefore, a 32 KB compressed LBA space (equal to the size of the segment or the size of the maximum uncompressed data in the segment) may be allocated for the open segment to ensure enough space as the open segment being filled up (e.g., by the host 210 of FIG. 2). Once the segment is filled up, its open flag may be cleared, and any remaining or unused compressed LBA space allocated for the segment may be released.

In an example embodiment, the starting address field includes the starting address (of the compressed data corresponding to or mapped from the uncompressed data in the segment) in the compressed LBA space. The total length field includes a total length (in 1 KB units) of the compressed data corresponding to or mapped from the uncompressed data in the segment. The first length field (len0) to the seventh length field (len6) include lengths (i.e., the first length to the seventh length, in 1 KB units) of each compressed block. It is to be understood that for a segment (eight uncompressed blocks), there can be up to eight compressed blocks, and the length for the eighth compressed block can be determined based on the total length and the first through the seventh length.

Figure 9:
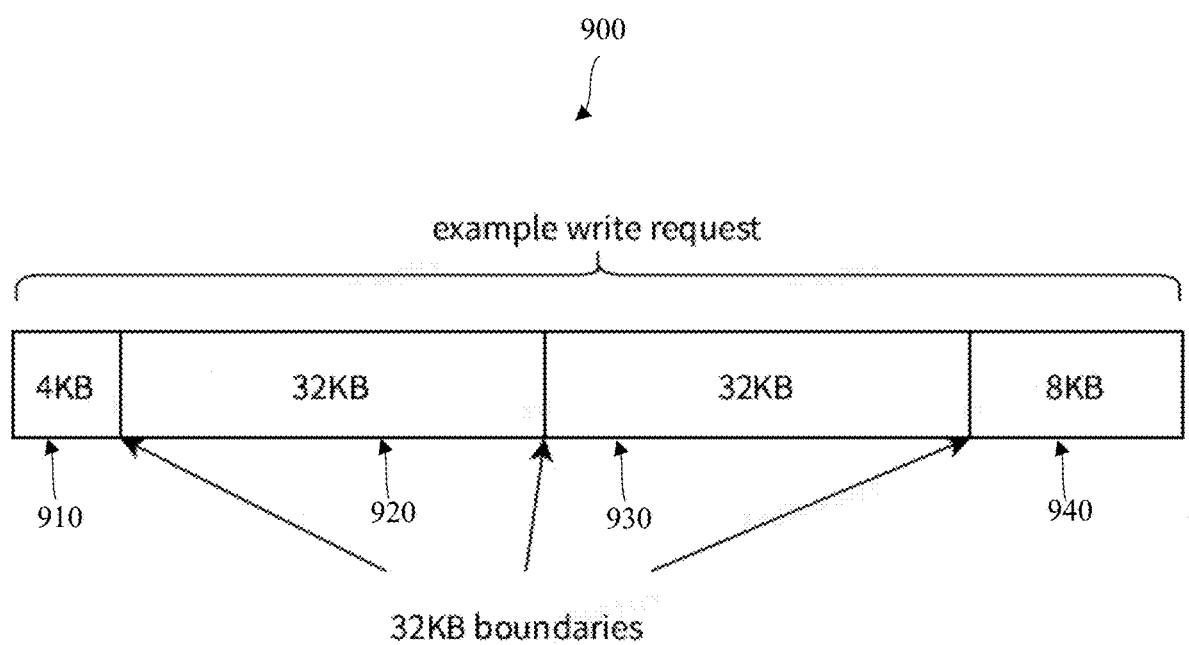
FIG. 9 is a schematic view of an example write request, arranged in accordance with at least some embodiments described herein.

FIG. 9 is a schematic view of an example write request 900, arranged in accordance with at least some embodiments described herein.

In an example embodiment, the host (e.g., 210 of FIG. 2) can write uncompressed data (the workload) having a size less than, equal to, or greater than a size of a segment, to the block device. The uncompressed data may be compressed (transparently to the host) by the block device level compression module 220 of FIG. 2, and stored into the block device at the address (the compressed LBA) by mapping the uncompressed LBA (and/or segment and/or segment number) to the compressed LBA.

In an example embodiment, the workload (of the host write(s) request) can be split at the boundaries of the segment(s) (e.g., a 32 KB segment or the like). The split workload can then be processed (e.g., written to the block device) individually. In an example embodiment, as shown in FIG. 9, the workload of a host's write request may be split into a head request 910, one or more segment requests (92, 930), and a tail request 940. It is to be understood that depending on the size of the workload and the boundaries of segments, any request (910, 920, 930, or 940) may have a size of zero. It is also to be understood that a size of the head request 910 (and/or a size of the tail request 940) is less than a size of the segment request. The size of each segment request (92, 930) is a size of a segment (e.g., 32 KB or the like).

In an example embodiment, a segment state bitmap (SSBM, not shown) may be maintained. The SSBM may be preserved persistently (e.g., as a metadata stored in the block device, etc.), and/or may be loaded into memory at runtime. In an example embodiment, each segment (or segment number, which may be used as the index of the entries of the mapping table 710 of FIG. 7) may need 1 bit (e.g., a state flag) in the SSBM to indicate whether the entry is a continuous entry (e.g., using the SMT entry) or a randomly mapped entry (e.g., using one or more of the eight FHT entries). That is, for each segment (e.g., 32 KB uncompressed LBA), there is 1 bit (e.g., the state flag) in the SSBM corresponding to that segment. When the entry of the mapping table 710 of FIG. 7 is accessed, the entry's corresponding bit (or the state flag) in the SSBM may be checked. When its SSBM bit/flag is set, the entry of the mapping table 710 of FIG. 7 is considered as an SMT entry for address mapping, and the address mapping sub-system is in the segment mapping mode. When its SSBM bit/flag is cleared (or not set), the entry of the mapping table 710 of FIG. 7 is considered as multiple FHT entries (e.g., eight entries) for address mapping, and the address mapping sub-system is in the flat hash table mapping mode.

Figure 10:
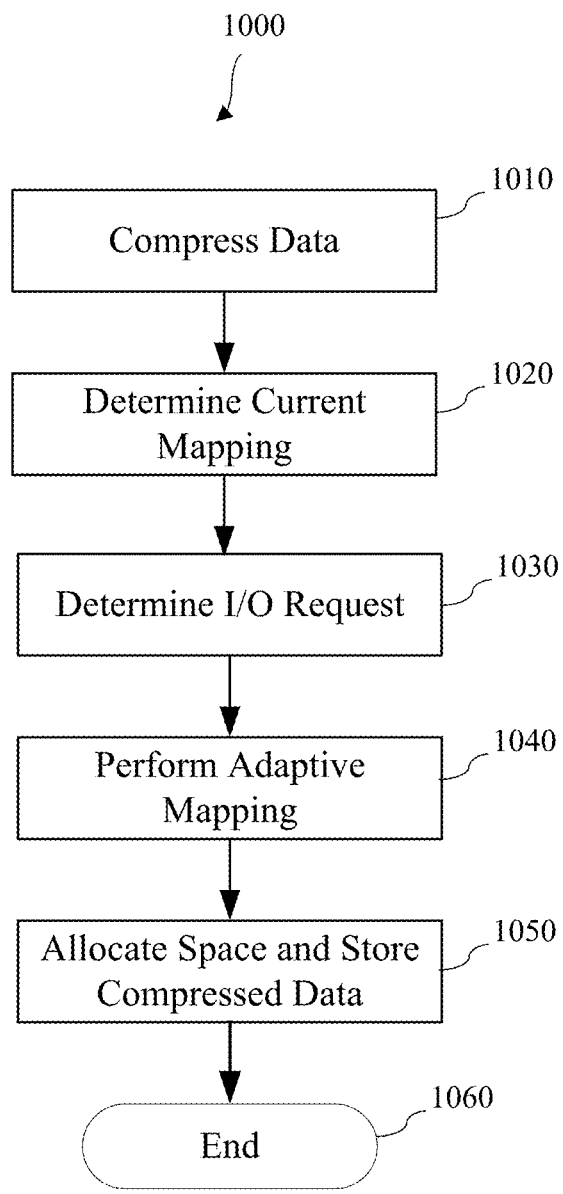
FIG. 10 is a flow chart illustrating an example write processing flow of block device level compression adaptive mapping, in accordance with at least some embodiments described herein.

FIG. 10 is a flow chart illustrating an example write processing flow 1000 of block device level compression adaptive mapping, in accordance with at least some embodiments described herein.

It is to be understood that the processing flow 1000 disclosed herein can be conducted by one or more processors (e.g., the processor of one or more of the terminal device 110, 120, 130, and 140 of FIG. 1, the processor of the server 150 of FIG. 1, the central processor unit 1205 of FIG. 12, a processor of the block device level compression module 220 of FIG. 2, and/or any other suitable processor), unless otherwise specified.

It is also to be understood that the processing flow 1000 can include one or more operations, actions, or functions as illustrated by one or more of blocks 1010, 1020, 1030, 1040, 1050, and 1060. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 1000, operations including initializations or the like may be performed. For example, system parameters and/or application parameters may be initialized, the mapping table 710 (and/or the segment state bitmap) of FIG. 7 may be populated (e.g., from the metadata on the block storage device and/or update journal after power loss) into the memory and/or maintained in memory at runtime, etc. It is also to be understood that the data to be stored or written (the uncompressed data) and/or the uncompressed block address may be received from the host (e.g., the server 150 of FIG. 1 or 210 of FIG. 2). The processing flow 1000 may be transparent to the host and/or the application (that requests the write process) that is run on the host.

Processing flow 1000 may begin at block 1010. It is to be understood that block 1010 may be performed any time before block 1050, block 1020 and block 1030 can be performed any time before block 1040. Blocks that do not have dependencies may be performed in series or in parallel at any time.

At block 1010 (Compress Data), the processor may compress the data to be stored (the workload or the uncompressed data of the host's write request) to compressed data e.g., using a compression algorithm or the like. Processing may proceed from block 1010 to block 1020.

At block 1020 (Determine Current Mapping), the processor may obtain or receive the uncompressed LBA or segment or segment number of the workload, determine the entry or entries (e.g., one SMT entry or multiple/eight FHT entries, having a size of 8 B or the like) of the mapping table 710 of FIG. 7 using the uncompressed LBA or segment or segment number of the workload as the index of the mapping table 710, and determine the current mapping or status of the entry or entries of the mapping table 710. In an example embodiment, the current mapping or status of an entry can be a no-mapping, a segment mapping (using the segment mapping mode), or a hash mapping (using the flat hash table mapping mode).

It is to be understood that the processor may determine whether the current status of the entry is the no-mapping. An empty or zero entry of the mapping table 710 may indicate that there is no-mapping for such entry. That is, all fields of such entry of the mapping table 710 may be zero. It is also to be understood that for an empty block storage device (e.g., prepared for its first use), all entries of the mapping table 710 may be empty (e.g., initialized as zeros, etc.) indicating that no uncompressed block address is mapped to any compressed block address. The existence of a mapping is indicated by a non-empty or non-zero entry of the mapping table 710.

It is further to be understood that when there is a mapping, the processor may determine whether the current status of the entry is the segment mapping or the hash mapping by checking the SSBM bit/flag corresponding to the entry. When the corresponding SSBM bit is set, the current status of the entry is the segment mapping. When the corresponding SSBM bit is cleared, the current status of the entry is the hash mapping. Processing may proceed from block 1020 to block 1030.

At block 1030 (Determine I/O request), the processor may determine the read/write (or I/O) request pattern of the workload from the host. The read/write (or I/O) request pattern of the workload may be obtained or received from the host.

In an example embodiment, the I/O request pattern may be a segment (e.g., 32 KB or the like) aligned write. Such pattern may be referred to as a sequential pattern. In an example embodiment, the I/O request pattern may be a 8 KB-16 KB write (e.g., a 8 KB, 12 KB, or 16 KB write, for 4 KB blocks), or a 4 KB write. Such pattern may be referred to as a random pattern. Processing may proceed from block 1030 to block 1040.

At block 1040 (Perform Adaptive Mapping), the processor may perform adaptive mapping (to dynamically switch between the segment mapping mode and the flat hash table mapping mode) based on the determined I/O request pattern and/or the current status of the entry (of the mapping table 710).

In an example embodiment, when the current mapping or current status is the no-mapping, and the I/O request pattern is a sequential pattern (segment/32 KB aligned write), the processor may create a SMT entry (see FIG. 8) for such write request and the segment mapping mode is used. The open flag/bit of the SMT entry can be set when creating the SMT entry and be cleared after the write request is processed. The processor may also set the SSBM bit/flag for such SMT entry. It is to be understood that the starting address of the SMT entry may be determined based on e.g., available compressed space that may accommodate the compressed data (the compressed workload) using a desired allocation mechanism.

In another example embodiment, when the current mapping or current status is the no-mapping, and the I/O request pattern is a random pattern (8 KB-16 KB write or 4 KB write), and if the workload is at beginning of a segment, the processor may create a SMT entry (see FIG. 8) for such write request, and the segment mapping mode is used. The open flag/bit of the SMT entry can be set. The processor may also set the SSBM bit/flag for such SMT entry. It is to be understood that when starting an open segment (e.g., the open flag/bit is set), its compressed size is unknown because the segment may not be filled up yet. In such case, a compressed LBA space equal to a size of a segment (e.g., 32 KB or the like) may be allocated for the open segment to ensure enough space.

In yet another example embodiment, when the current mapping or current status is the no-mapping, and the I/O request pattern is a random pattern (8 KB-16 KB write or 4 KB write), and if the workload is not at beginning of a segment, the processor may create FHT entry or entries (see FIG. 3A) for such write request, and the flat hash table mapping mode is used. The processor may also clear (or not set) the SSBM bit/flag for such FHT entry/entries.

In yet another example embodiment, when the current mapping or current status is the segment mapping, and the I/O request pattern is a sequential pattern (segment/32 KB aligned write), the processor may overwrite the existing SMT entry (see FIG. 8) for such write request, and the segment mapping mode is used. The open flag/bit of the SMT entry (if it is set) can be cleared after the write request is processed. The processor may further set the SSBM bit/flag for such SMT entry.

In yet another example embodiment, when the current mapping or current status is the segment mapping, and the I/O request pattern is a random pattern (8 KB-16 KB write or 4 KB write), and if the workload is appending to an open segment (by checking the uncompressed LBA of the workload and the ending uncompressed LBA of the open segment), the processor may update the existing SMT entry (see FIG. 8) for such write request to append the workload to the open segment, and the segment mapping mode is used. The open flag/bit of the SMT entry can be cleared if the open segment is filled up. The processor may also set the SSBM bit/flag for such SMT entry (or do nothing regarding the SSBM bit/flag if the bit/flag is already set). It is to be understood that such I/O request (the write request) is trying to write after the end of an open segment. In this case, new data (the new workload) may be appended to the open segment. Once the open segment is filled up (e.g., all 8 blocks are written), its "open" bit/flag can be cleared and the remaining or unused space in its allocated compressed LBA space may be released.

In yet another example embodiment, when the current mapping or current status is the segment mapping, and the I/O request pattern is a random pattern (8 KB-16 KB write or 4 KB write), and if the workload is not appending to an open segment (by checking the uncompressed LBA of the workload and the ending uncompressed LBA of the open segment), the processor may convert the existing SMT entry (see FIG. 8) to FHT entries for such write request, and the flat hash table mapping mode is used. The processor may also clear the SSBM bit/flag for such FHT entry/entries. It is to be understood that such I/O request may result in converting a segment mapping status to a hash mapping status. The blocks already written in the segment may be remapped using the flat hash table mapping mode and their old segment mapping(s) may be released.

In yet another example embodiment, when the current mapping or current status is the hash mapping, and the I/O request pattern is a sequential pattern (segment/32 KB aligned write), the processor may convert the existing FHT entries (see FIG. 3A) to a SMT entry for such write request, and the segment mapping mode is used. The processor may also set the SSBM bit/flag for the converted segment entry. It is to be understood that such I/O request may result in converting the hash mapping status to the segment mapping status. All blocks in this segment are remapped using the segment mapping mode, and their old flat table has mapping(s) may be released.

In yet another example embodiment, when the current mapping or current status is the hash mapping, and the I/O request pattern is a random pattern (8 KB-16 KB write), the processor may split the workload to 4 KB portions, and overwrite the existing FHT entry/entries (see FIG. 3A) for such write request, and the flat hash table mapping mode is used. The processor may also clear the SSBM bit/flag for such FHT entry/entries (or do nothing regarding the SSBM bit/flag if the bit/flag is already cleared or not set).

In yet another example embodiment, when the current mapping or current status is the hash mapping, and the I/O request pattern is a random pattern (4 KB write), the processor may overwrite the existing FHT entry (see FIG. 3A) for such write request, and the flat hash table mapping mode is used. The processor may also clear the SSBM bit/flag for such FHT entry (or do nothing regarding the SSBM bit/flag if the bit/flag is already cleared or not set).

It is to be understood that in the embodiments disclosed herein, the entry of the mapping table 710 may be adjusted (e.g., created, converted to other entry/entries, overwritten, updated, etc.) based on the I/O request pattern, and/or the current status of the entry, or the like.

Processing may proceed from block 1040 to block 1050. At block 1050 (Allocate Space and Store Compressed Data), the processor may allocate a space that corresponds to a compressed LBA mapped from the uncompressed LBA/segment. It is to be understood that the space may be allocated at Block 1040 when the mapping (from the uncompressed LBA/segment to the compressed LBA) is determined. That is, when performing the adaptive mapping to determine the staring address (and the total length) for the SMT entry or determine the hash function for the FHT entry/entries, the starting address (and the total length) or the hash function may be determined so that there is a mapping to a compressed block address with enough free slivers or free space in the block storage device for the compressed data. When the starting address (and the total length) or the hash function is determined, the compressed block address can be determined, and the corresponding free slivers or free space may be allocated in the block storage device (i.e., the block device). The processor may also store or write the compressed data (from block 1010) to the mapped compressed block address (derived from or corresponding to the fields in the SMT entry or FHT entry/entries). Processing may proceed from block 1050 to block 1060.

At block 1060 (End), the processor may end the write processing flow 1000 and/or report to the host that the write process is completed.

Figure 11:
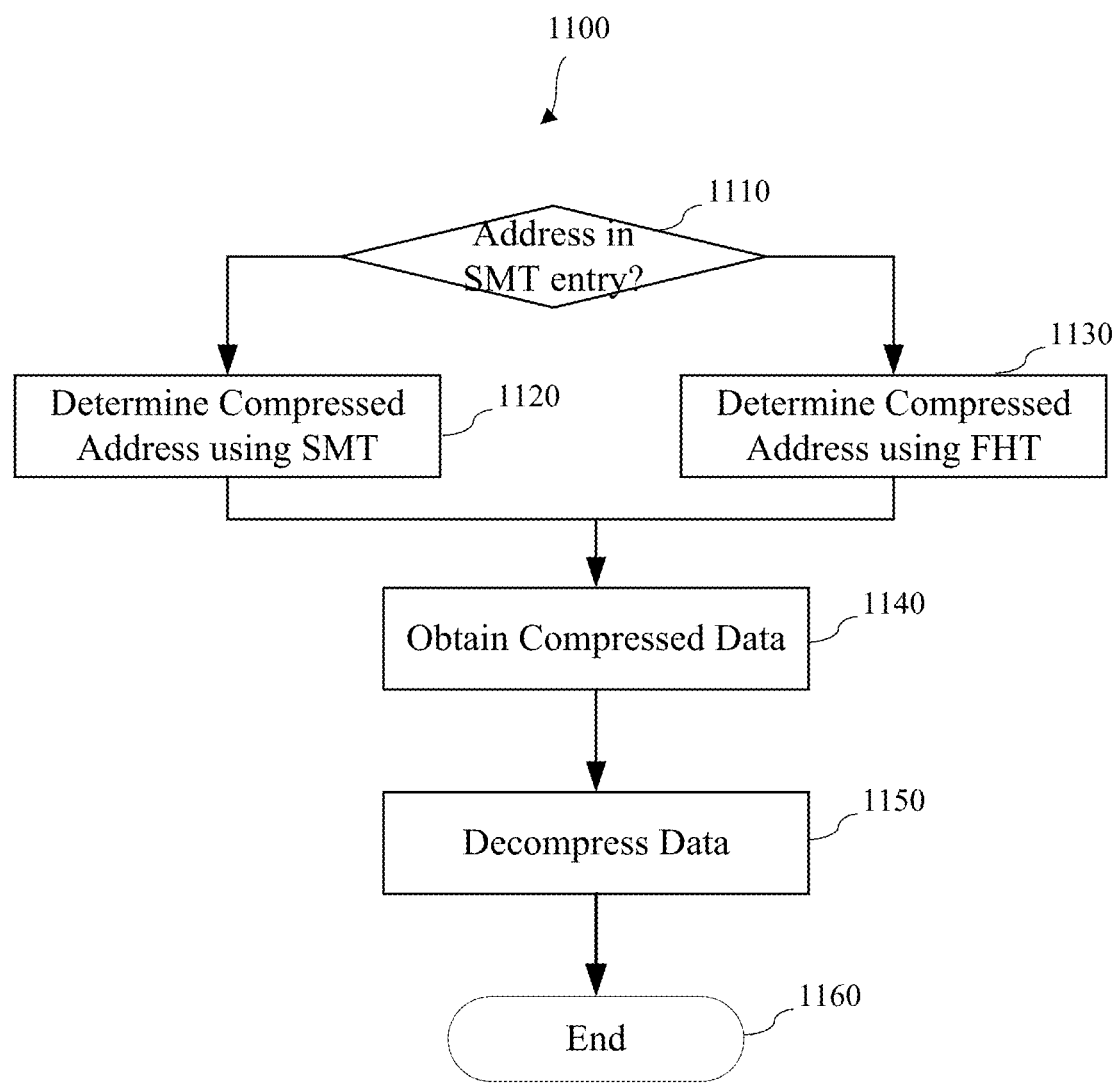
FIG. 11 is a flow chart illustrating an example read processing flow of block device level compression adaptive mapping, in accordance with at least some embodiments described herein.

FIG. 11 is a flow chart illustrating an example read processing flow 1100 of block device level compression adaptive mapping, in accordance with at least some embodiments described herein.

It is to be understood that the processing flow 1100 disclosed herein can be conducted by one or more processors (e.g., the processor of one or more of the terminal device 110, 120, 130, and 140 of FIG. 1, the processor of the server 150 of FIG. 1, the central processor unit 1205 of FIG. 12, a processor of the block device level compression module 220 of FIG. 2, and/or any other suitable processor), unless otherwise specified.

It is also to be understood that the processing flow 1100 can include one or more operations, actions, or functions as illustrated by one or more of blocks 1110, 1120, 1130, 1140, 1150, and 1160. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 1100, operations including initializations or the like may be performed. For example, system parameters and/or application parameters may be initialized, the mapping table 710 (and/or the SSBM) and other table(s) and/or bitmap(s) may be populated (e.g., from the metadata on the block storage device and/or update journal after a power loss) into the memory and/or maintained in the memory at runtime, etc. Processing flow 1100 may begin at block 1110. It is also to be understood that the uncompressed block address may be received from the host (e.g., the server 150 of FIG. 1, the host 210 of FIG. 2, etc.). The processing flow 1100 may be transparent to the host and/or the application (that requests the read process) that is run on the host.

At block 1110 (Address in SMT entry?), the processor may retrieve or obtain the content of an entry of the mapping table 710 using the uncompressed LBA (or segment number) as the index of the mapping table 710 to locate the entry. It is to be understood that the uncompressed LBA/segment is the address that presented to, received from, and/or accessible by the host. Each segment or segment number may correspond to an entry of the mapping table 710, which is indexed using the segment number.

The processor may also obtain the SSBM bit/flag that corresponds to the entry of the mapping table 710. If the SSBM flag is set, then the corresponding entry of the mapping table 710 may be treated as an SMT entry, processing may proceed from block 1110 to block 1120. If the SSBM flag is not set (e.g., cleared), then the corresponding entry of the mapping table 710 may be treated as multiple (e.g., eight) FHT entries, processing may proceed from block 1110 to block 1130.

At block 1120 (Determine Compressed Address using SMT), the processor may treat the entry identified at block 1110 as an SMT entry (see FIG. 8), and determine the compressed LBA using e.g., the starting address and total length (and other lengths) in the SMT entry. Processing may proceed from block 1120 to block 1140.

At block 1130 (Determine Compressed Address using FHT), the processor may treat the entry identified at block 1110 as multiple (e.g., eight) FHT entries (see FIG. 3A), and determine the compressed LBA using e.g., the hash function index (and/or the usage bitmap) in the FHT entry (see FIGS. 3A-6B). Processing may proceed from block 1130 to block 1140.

At block 1140 (Obtain Compressed Data), the processor may obtain, read, or retrieve the compressed data from the space in the block storage device that corresponds to the compressed LBA. Processing may proceed from block 1140 to block 1150.

At block 1150 (Decompress Data), the processor may decompress the compressed data from block 1140 to uncompressed (or decompressed) data using e.g., a compression/decompression algorithm or the like. Processing may proceed from block 1150 to block 1160.

At block 1160 (End), the processor may end the read processing flow 1100 and/or report to the host that the read process is completed by e.g., returning the decompressed data from block 1150 to the host (or to the application that is run on the host).

It is to be understood that if the uncompressed LBA (of the I/O request such as a read request) is in a segment (either open or closed), the processor may obtain its compressed LBA from the SMT entry, read the compressed data from the block storage device, decompress the compressed data, and return the decompressed data to the host. If the uncompressed LBA is in an FHT entry, the processor may obtain its compressed LBA with the flat hash table mapping scheme, read the compressed data from the block storage device, decompress the compressed data, and return the decompressed data to the host.

FIG. 12 is a schematic structural diagram of an example computer system 1200 applicable to implementing an electronic device (for example, the server or one of the terminal devices shown in FIG. 1), arranged in accordance with at least some embodiments described herein. It is to be understood that the computer system shown in FIG. 12 is provided for illustration only instead of limiting the functions and applications of the embodiments described herein.

As depicted, the computer system 1200 may include a central processing unit (CPU) 1205. The CPU 1205 may perform various operations and processing based on programs stored in a read-only memory (ROM) 1210 or programs loaded from a storage device 1240 to a random-access memory (RAM) 1215. The RAM 1215 may also store various data and programs required for operations of the system 1200. The CPU 1205, the ROM 1210, and the RAM 1215 may be connected to each other via a bus 1220. An input/output (I/O) interface 1225 may also be connected to the bus 1220.

The components connected to the I/O interface 1225 may further include an input device 1230 including a keyboard, a mouse, a digital pen, a drawing pad, or the like; an output device 1235 including a display such as a liquid crystal display (LCD), a speaker, or the like; a storage device 1240 including a hard disk or the like; and a communication device 1245 including a network interface card such as a LAN card, a modem, or the like. The communication device 1245 may perform communication processing via a network such as the Internet, a WAN, a LAN, a LIN, a cloud, etc. In an embodiment, a driver 1250 may also be connected to the I/O interface 1225. A removable medium 1255 such as a magnetic disk, an optical disk, a magneto-optical disk, a semiconductor memory, or the like may be mounted on the driver 1250 as desired, such that a computer program read from the removable medium 1255 may be installed in the storage device 1240.

It is to be understood that the processes described with reference to the flowcharts of FIGS. 4-5 and 10-11 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 1245, and/or may be installed from the removable medium 1255. The computer program, when being executed by the central processing unit (CPU) 1205, can implement the above functions specified in the method in the embodiments disclosed herein.

Features of the embodiments disclosed herein may combine a segment based mapping table and a flat hash table mapping solutions, adapt to workload's I/O pattern by dynamically switching between the segment mapping mode and the flat hash table mapping mode, use SMT to track sequential mappings at 32 KB segment storage levels, and use FHT for tracking random mappings at 4 KB storage levels. If the I/O request is regarded as sequential, segment based mapping may be used. If the I/O request is regarded as random, its mapping may be converted to a flat hash table mapping. The SMT and FHT are designed to share the same memory region, hence there is no additional memory overhead. A segment mapping entry (e.g., an SMT entry) may take 8 bytes and be used for tracking the mapping of a 32 KB segment. A flat hash table mapping entry (FHT entry) can be 1 byte and be used for tracking the mapping of a 4 KB block. When a segment is converted to use a flat hash table mapping mode, its SMT entry can be converted to eight FHT entries.

Features of the embodiments disclosed herein may have the same low memory overhead as the flat hash table scheme. The memory overhead or usage may include 1-byte FHT entry per 4 KB uncompressed data, or 8-byte SMT entry per 32 KB segment. Therefore, all mapping information can be tracked in the memory.

It is to be understood that when a segment is converted to use a flat hash table mapping mode, its SMT entry can be converted into 8 FHT entries. Each FHT entry may track the mapping of one 4 KB block in this segment. Each FHT entry is 1 byte (8 bits), following the same format as described in the hybrid flat hash table scheme (see FIGS. 3A-6B).

It is also to be understood that since the SMT and FHT entries share the same memory, memory usage of the adaptive mapping scheme can be substantially the same as the hybrid flat hash table scheme. The memory usage includes 8 B (for SMT/FHT) per 32 KB or 1 B per 4 KB uncompressed address, 0.5 byte (for the compressed block allocation table) per each 4 KB compressed address, 1 bit (for the overflow bitmap) per each 4 KB uncompressed address, 1 bit (for the metadata bitmap) per each 4 KB compressed address, 1 bit (for the SSBM) per 32 KB uncompressed LBA/segment. That is, assuming the uncompressed LBA space is two-times larger than the compressed LBA space (e.g., due to the compression ratio achieved by the compression algorithm), the overall memory usage may be 1.453125 bytes per 4 KB (uncompressed LBA space) or 0.035% of the uncompressed space.

Features of the embodiments disclosed herein may provide transparent block device level compression that combines the segment based mapping and the flat hash table mapping which can adapt to the workload's I/O request pattern dynamically at runtime. Architectural design of the adaptive mapping scheme includes an adaptive design combining the segment mapping and the flat hash table mapping. Features of the embodiments disclosed herein may provide adaptive design combining the segment mapping and the flat hash table mapping, and provide design of mapping tables, such that the segment mapping and the flat hash table mapping share the same memory. Mapping entries can be converted between the segment mapping and the flat hash table mapping at runtime.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for adaptive mapping for data compression, the method comprising: determining an input/output (I/O) request pattern; dynamically switching between a segment mapping mode and a flat hash table mapping mode based on the determined I/O request pattern; updating a shared mapping table for the segment mapping mode and the flat hash table mapping mode; and adjusting an entry of the mapping table based on the determined I/O request pattern and a status of the entry.

Aspect 2. The method of aspect 1, further comprising: compressing uncompressed to compressed data; and storing the compressed data to a space in a block storage device that corresponds to a compressed block address indicated by the adjusted entry.

Aspect 3. The method of aspect 1 or aspect 2, wherein the I/O request pattern includes a sequential pattern and/or a random pattern, and dynamically switching between the segment mapping mode and the flat hash table mapping mode based on the determined I/O request pattern includes: switching to the segment mapping mode when the determined I/O request pattern is the sequential pattern; and switching to the flat hash table mapping mode when the determined I/O request pattern is the random pattern.

Aspect 4. The method of aspect 3, wherein the status includes a no-mapping, a segment mapping, and a hash mapping, and adjusting the entry of the mapping table based on the determined I/O request pattern and the status of the entry includes: when the status is the hash mapping and the determined I/O request pattern is the sequential pattern, converting the hash mapping to the segment mapping for segment aligned access; and when the status is the segment mapping and the determined I/O request pattern is the random pattern, converting the segment mapping to the hash mapping for non-segment aligned access.

Aspect 5. The method of aspect 4, further comprising: when the status is the no-mapping, generating the segment mapping for the segment aligned access and generating the hash mapping for the non-segment aligned access.

Aspect 6. The method of any one of aspects 1-5, wherein the entry includes an open flag, the method further comprising: allocating a maximum space in a block storage device for a segment data when the open flag is set.

Aspect 7. The method of aspect 6, further comprising: releasing unused space in the block storage device for the segment data when the open flag is cleared.

Aspect 8. The method of any one of aspects 1-7, wherein the entry includes a starting address and a total length, the method further comprising: accessing compressed data in a block storage device based on the starting address and the total length.

Aspect 9. The method of any one of aspects 1-8, wherein the entry includes a plurality of subentries, each subentry including a hash function index and a usage bitmap, the method further comprising: accessing compressed data in a block storage device based on the subentry.

Aspect 10. The method of any one of aspects 1-9, further comprising: accessing the shared mapping table in the segment mapping mode when a state flag in a segment state bitmap is set, accessing the shared mapping table in the flat hash table mapping mode when the state flag in the segment state bitmap is cleared.

Aspect 11. A block storage device control system, the system comprising: a memory region tracking a shared mapping table; a processor to: determine an input/output (I/O) request pattern; dynamically switch between a segment mapping mode and a flat hash table mapping mode based on the determined I/O request pattern; access the mapping table for the segment mapping mode and the flat hash table mapping mode; adjust an entry of the mapping table based on the determined I/O request pattern and a status of the entry; compress uncompressed data to compressed data; and store the compressed data to a space in a block storage device that corresponds to a compressed block address indicated by the adjusted entry.

Aspect 12. The system of aspect 11, wherein the I/O request pattern includes a sequential pattern and/or a random pattern, the processor is to further: switch to the segment mapping mode when the determined I/O request pattern is the sequential pattern; and switch to the flat hash table mapping mode when the determined I/O request pattern is the random pattern.

Aspect 13. The system of aspect 12, wherein the status includes a no-mapping, a segment mapping, and a hash mapping, the processor is to further: convert the hash mapping to the segment mapping for segment aligned access when the status is the hash mapping and the determined I/O request pattern is the sequential pattern; and convert the segment mapping to the hash mapping for non-segment aligned access when the status is the segment mapping and the determined I/O request pattern is the random pattern.

Aspect 14. The system of aspect 13, the processor is to further: when the status is the no-mapping, generate the segment mapping for the segment aligned access and generate the hash mapping for the non-segment aligned access.

Aspect 15. The system of any one of aspects 11-14, wherein the entry includes an open flag, the processor is to further: allocate a maximum space in the block storage device for a segment data when the open flag is set.

Aspect 16. A non-transitory computer-readable medium having computer-executable instructions stored thereon that, upon execution, cause one or more processors to perform operations comprising: determining an input/output (I/O) request pattern; dynamically switching between a segment mapping mode and a flat hash table mapping mode based on the determined I/O request pattern; accessing a shared mapping table for the segment mapping mode and the flat hash table mapping mode; adjusting an entry of the mapping table based on the determined I/O request pattern and a status of the entry; compressing uncompressed data to compressed data; and storing the compressed data to a space in a block storage device that corresponds to a compressed block address indicated by the adjusted entry.

Aspect 17. The computer-readable medium of aspect 16, wherein the entry includes an open flag, the operations further comprise: allocating a maximum space in the block storage device for a segment data when the open flag is set.

Aspect 18. The computer-readable medium of aspect 17, the operations further comprise: releasing unused space in the block storage device for the segment data when the open flag is cleared.

Aspect 19. The computer-readable medium of any one of aspects 16-18, wherein the entry includes a starting address and a total length, the operations further comprise: accessing the compressed data in the block storage device based on the starting address and the total length.

Aspect 20. The computer-readable medium of any one of aspects 16-19, wherein the entry includes a plurality of subentries, each subentry including a hash function index and a usage bitmap, the operations further comprise: accessing the compressed data in the block storage device based on the subentry.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for adaptive mapping for data compression, the method comprising:
   determining an input/output (I/O) request pattern;
   dynamically switching between a segment mapping mode and a flat hash table mapping mode based on the determined I/O request pattern;
   updating a shared mapping table for the segment mapping mode and the flat hash table mapping mode; and
   adjusting an entry of the shared mapping table based on the determined I/O request pattern and a status of the entry.

2. The method of claim 1, further comprising:
   compressing uncompressed to compressed data; and
   storing the compressed data to a space in a block storage device that corresponds to a compressed block address indicated by the adjusted entry.

3. The method of claim 1, wherein the I/O request pattern includes a sequential pattern or a random pattern, and
   dynamically switching between the segment mapping mode and the flat hash table mapping mode based on the determined I/O request pattern includes:
   switching to the segment mapping mode when the determined I/O request pattern is the sequential pattern; and
   switching to the flat hash table mapping mode when the determined I/O request pattern is the random pattern.

4. The method of claim 3, wherein the status includes a no-mapping, a segment mapping, and a hash mapping, and
   adjusting the entry of the shared mapping table based on the determined I/O request pattern and the status of the entry includes:
   when the status is the hash mapping and the determined I/O request pattern is the sequential pattern, converting the hash mapping to the segment mapping for segment aligned access; and
   when the status is the segment mapping and the determined I/O request pattern is the random pattern, converting the segment mapping to the hash mapping for non-segment aligned access.

5. The method of claim 4, further comprising:
   when the status is the no-mapping, generating the segment mapping for the segment aligned access and generating the hash mapping for the non-segment aligned access.

6. The method of claim 1, wherein the entry includes an open flag, the method further comprising:
   allocating a maximum space in a block storage device for a segment data when the open flag is set.

7. The method of claim 6, further comprising:
   releasing unused space in the block storage device for the segment data when the open flag is cleared.

8. The method of claim 1, wherein the entry includes a starting address and a total length, the method further comprising:
   accessing compressed data in a block storage device based on the starting address and the total length.

9. The method of claim 1, wherein the entry includes a plurality of subentries, each subentry including a hash function index and a usage bitmap, the method further comprising:
   accessing compressed data in a block storage device based on the subentry.

10. The method of claim 1, further comprising:
    accessing the shared mapping table in the segment mapping mode when a state flag in a segment state bitmap is set,
    accessing the shared mapping table in the flat hash table mapping mode when the state flag in the segment state bitmap is cleared.

11. A block storage device control system, the system comprising:
    a memory region tracking a shared mapping table;
    a processor to:
    determine an input/output (I/O) request pattern;
    dynamically switch between a segment mapping mode and a flat hash table mapping mode based on the determined I/O request pattern;
    access the shared mapping table for the segment mapping mode and the flat hash table mapping mode;
    adjust an entry of the shared mapping table based on the determined I/O request pattern and a status of the entry;
    compress uncompressed data to compressed data; and
    store the compressed data to a space in a block storage device that corresponds to a compressed block address indicated by the adjusted entry.

12. The system of claim 11, wherein the I/O request pattern includes a sequential pattern or a random pattern, the processor is to further:
    switch to the segment mapping mode when the determined I/O request pattern is the sequential pattern; and
    switch to the flat hash table mapping mode when the determined I/O request pattern is the random pattern.

13. The system of claim 12, wherein the status includes a no-mapping, a segment mapping, and a hash mapping, the processor is to further:
    convert the hash mapping to the segment mapping for segment aligned access when the status is the hash mapping and the determined I/O request pattern is the sequential pattern; and
    convert the segment mapping to the hash mapping for non-segment aligned access when the status is the segment mapping and the determined I/O request pattern is the random pattern.

14. The system of claim 13, the processor is to further:
    when the status is the no-mapping, generate the segment mapping for the segment aligned access and generate the hash mapping for the non-segment aligned access.

15. The system of claim 11, wherein the entry includes an open flag, the processor is to further:
    allocate a maximum space in the block storage device for a segment data when the open flag is set.

16. A non-transitory computer-readable medium having computer-executable instructions stored thereon that, upon execution, cause one or more processors to perform operations comprising:
    determining an input/output (I/O) request pattern;
    dynamically switching between a segment mapping mode and a flat hash table mapping mode based on the determined I/O request pattern;
    accessing a shared mapping table for the segment mapping mode and the flat hash table mapping mode;
    adjusting an entry of the shared mapping table based on the determined I/O request pattern and a status of the entry;
    compressing uncompressed data to compressed data; and
    storing the compressed data to a space in a block storage device that corresponds to a compressed block address indicated by the adjusted entry.

17. The computer-readable medium of claim 16, wherein the entry includes an open flag, the operations further comprise:
   allocating a maximum space in the block storage device for a segment data when the open flag is set.

18. The computer-readable medium of claim 17, the operations further comprise:
   releasing unused space in the block storage device for the segment data when the open flag is cleared.

19. The computer-readable medium of claim 16, wherein the entry includes a starting address and a total length, the operations further comprise:
   accessing the compressed data in the block storage device based on the starting address and the total length.

20. The computer-readable medium of claim 16, wherein the entry includes a plurality of subentries, each subentry including a hash function index and a usage bitmap, the operations further comprise:
   accessing the compressed data in the block storage device based on the subentry.

* * * * *